(12) United States Patent
Chen

(10) Patent No.: US 9,726,905 B2
(45) Date of Patent: Aug. 8, 2017

(54) WAVE-SHAPED TEMPLE INSERT

(71) Applicant: Advanced Eye Protection IP Holding, Park City, UT (US)

(72) Inventor: Stephen Charles Chen, Park City, UT (US)

(73) Assignee: Advanced Eye Protection IP Holding, Park City, UT (US)

( * ) Notice: Subject to any disclaimer, the term of this patent is extended or adjusted under 35 U.S.C. 154(b) by 76 days.

(21) Appl. No.: 14/804,751

(22) Filed: Jul. 21, 2015

(65) Prior Publication Data

US 2015/0323808 A1 Nov. 12, 2015

Related U.S. Application Data

(63) Continuation-in-part of application No. 14/029,563, filed on Sep. 17, 2013, now Pat. No. 9,122,079.

(60) Provisional application No. 62/027,161, filed on Jul. 21, 2014.

(51) Int. Cl.
| | |
|---|---|
| *G02C 5/14* | (2006.01) |
| *G02C 5/16* | (2006.01) |
| *G02C 5/00* | (2006.01) |
| *G02C 5/18* | (2006.01) |

(52) U.S. Cl.
CPC .............. *G02C 5/16* (2013.01); *G02C 5/00* (2013.01); *G02C 5/14* (2013.01); *G02C 5/143* (2013.01); *G02C 5/18* (2013.01)

(58) Field of Classification Search
CPC . G02C 5/00; G02C 5/14; G02C 5/143; G02C 5/16; G02C 5/18

USPC .......................... 351/111, 113, 114, 115, 117
See application file for complete search history.

(56) References Cited

U.S. PATENT DOCUMENTS

| | | | | |
|---|---|---|---|---|
| 1,649,789 A | * | 11/1927 | Stevens ..................... | G02C 5/18 351/117 |
| 1,708,204 A | * | 4/1929 | Welsh ....................... | G02C 5/00 351/114 |
| 1,845,807 A | * | 2/1932 | Nerney ..................... | G02C 5/00 351/114 |
| 4,299,456 A | * | 11/1981 | Solomon ............... | G02C 5/2209 351/111 |
| 4,904,075 A | * | 2/1990 | Blumenthal ............. | G02C 5/16 351/113 |
| 4,963,013 A | * | 10/1990 | Bononi ................... | A61F 9/029 351/111 |
| 4,978,209 A | * | 12/1990 | Ohba ..................... | G02C 5/008 16/228 |

(Continued)

*Primary Examiner* — William R Alexander
(74) *Attorney, Agent, or Firm* — Maschoff Brennan

(57) ABSTRACT

An example embodiment includes eyewear. The eyewear includes a lens, a brow piece, and two temple assemblies. The brow piece is configured to position the lens in front of the eyes of a user during use. The two temple assemblies are coupled to the brow piece by two hinges. Each of the temple assemblies are configured to extend along a side of a head of the user during use. Each of the temple assemblies includes a temple substrate and a wave-shaped insert. The wave-shape insert includes at least one horizontal span and at least one vertical portion. The horizontal span is configured to dictate the deflection of a first portion of the temple substrate and enable rotation of the first portion of the temple substrate about the horizontal span. The vertical portion is configured to dictate a torsional stiffness of a second portion of the temple assembly.

18 Claims, 14 Drawing Sheets

(56) References Cited

U.S. PATENT DOCUMENTS

| | | | | |
|---|---|---|---|---|
| 5,469,232 A * | 11/1995 | Ichimura | ............... | G02C 5/008 351/111 |
| 6,059,411 A * | 5/2000 | Moody | ................. | G02C 5/143 351/111 |
| 7,490,934 B2 * | 2/2009 | Yasuhara | ............... | G02C 5/143 351/117 |
| 7,553,017 B1 * | 6/2009 | Chen | ........................ | G02C 5/00 351/114 |
| 7,556,373 B2 * | 7/2009 | VanAtta | ................. | A61F 9/027 351/113 |
| 7,878,647 B2 * | 2/2011 | Hardy | ................... | G02C 5/146 351/114 |
| 2010/0110366 A1 * | 5/2010 | Shapiro | ................. | G02C 5/143 351/112 |
| 2010/0238395 A1 * | 9/2010 | Laustsen | ............... | G02C 5/008 351/117 |
| 2010/0290000 A1 * | 11/2010 | Krumme | ............... | G02C 1/023 351/140 |
| 2011/0080556 A1 * | 4/2011 | Yee | ......................... | G02C 5/16 351/114 |
| 2011/0181829 A1 * | 7/2011 | Horikawa | ............. | G02C 5/146 351/113 |

* cited by examiner

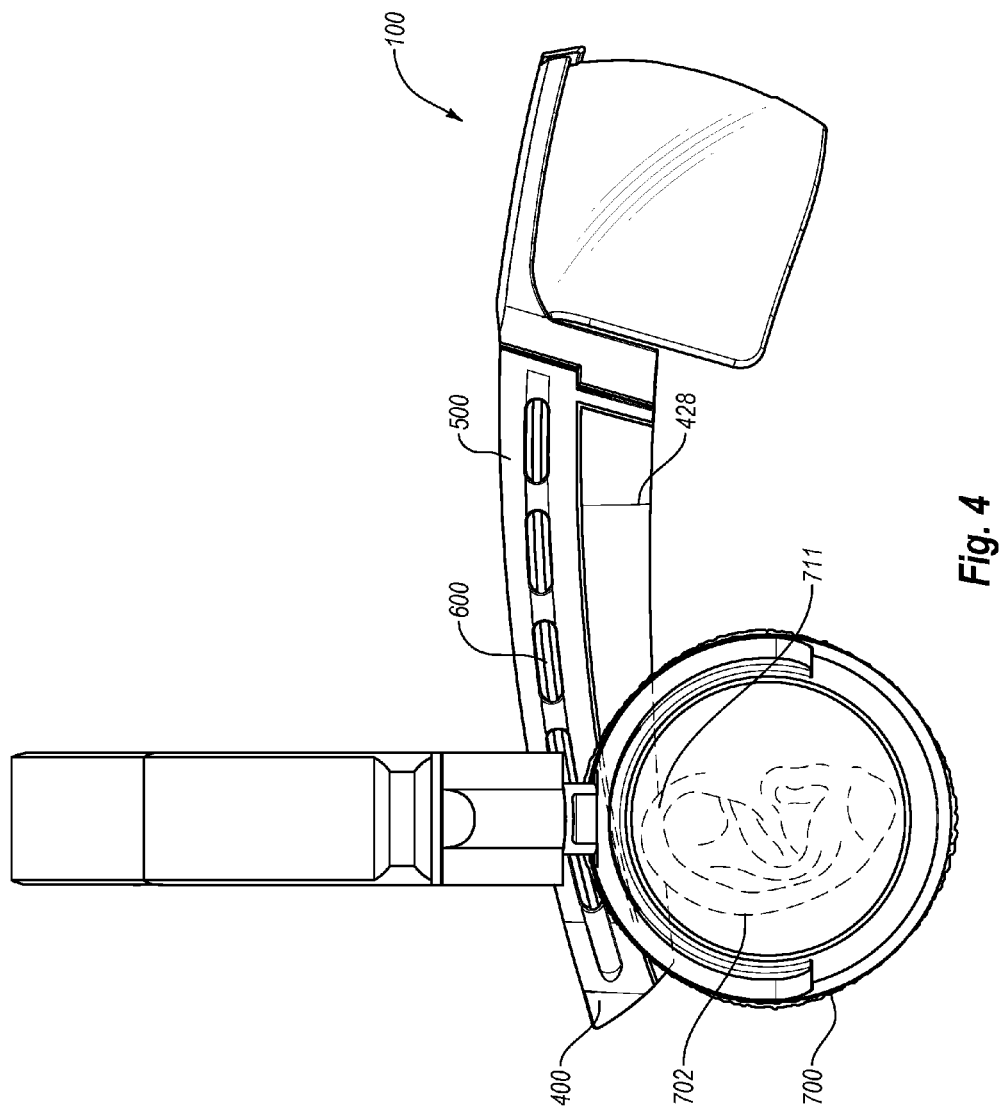

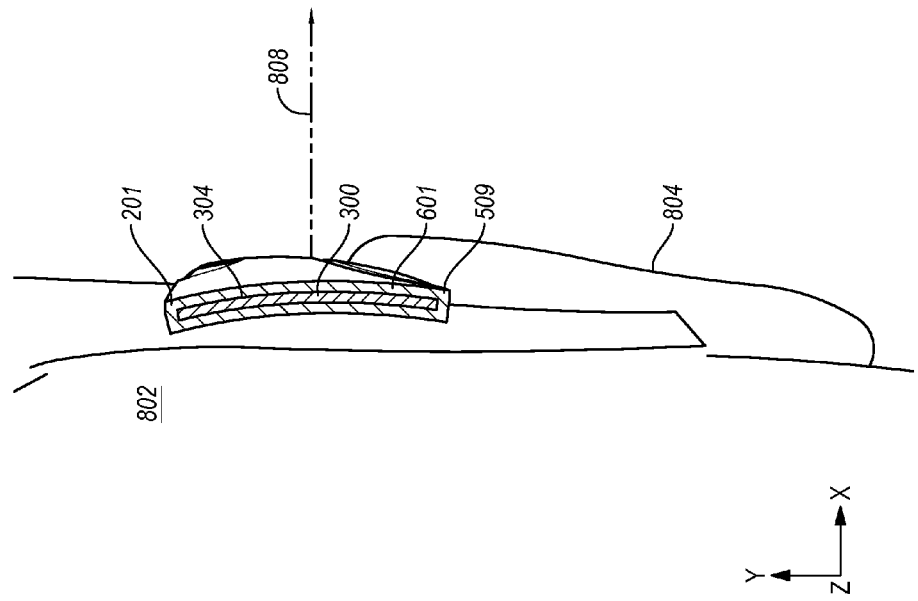
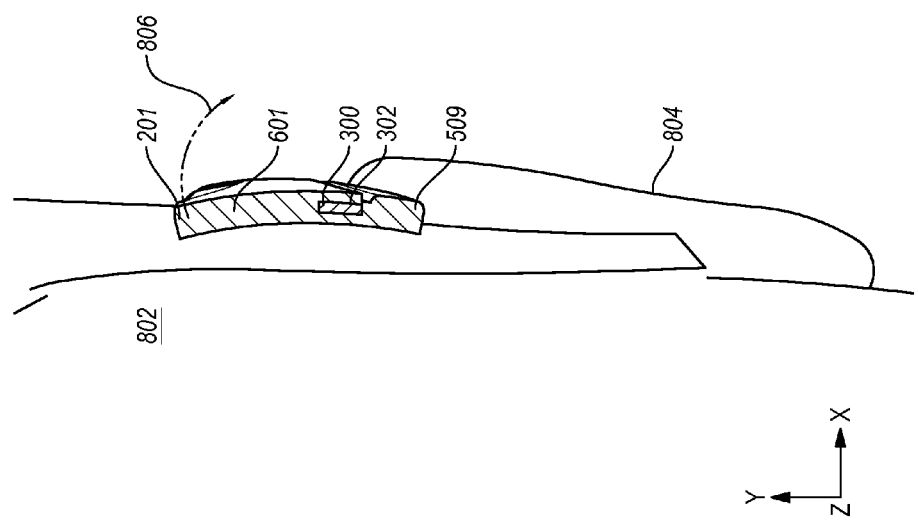

WAVE-SHAPED TEMPLE INSERT

RELATED APPLICATIONS

This patent application claims the benefit of and priority to U.S. Provisional Patent Application No. 62/027,161 filed Jul. 21, 2014. This patent is a continuation-in-part of U.S. patent application Ser. No. 14/029,563 filed Sep. 17, 2013 that claims the benefit of and priority to U.S. Provisional Patent Application No. 61/707,525 filed Sep. 28, 2012. The foregoing applications are incorporated herein by reference in their entireties.

FIELD

Some embodiments described herein relate to eyewear. More particularly, some example embodiments relate to a wave-shaped temple insert.

BACKGROUND

Eyewear is increasingly worn during activities and to protect a user's eyes and/or face. During use, the eyewear may cause discomfort to the user due to pressure points imposed on the head of the user by the eyewear. Additionally, some eyewear is unsuitable for certain head shapes due to this discomfort or to the limits of the materials from which the eyewear is composed. For example, individuals with large, round heads may not be able to wear eyewear designed for individuals with a narrow head. The individuals with the larger head may deform or break the eyewear and the eyewear may be pressed against the head of the individual causing discomfort. Moreover, eyewear designed for individuals with large heads may not be retained on the heads of individuals with narrow heads. For example, the eyewear may move or shift while an individual with a narrow head moves.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, eyewear that includes a lens, a brow piece, and two temple assemblies is described herein. The brow piece is configured to position the lens in front of eyes of a user during use. The two temple assemblies are coupled to the brow piece by two hinges. Each of the temple assemblies are configured to extend along a side of a head of the user during use. Each of the temple assemblies includes a temple substrate and a wave-shaped insert. The wave-shaped insert includes at least one horizontal span and at least one vertical portion. The horizontal span is configured to dictate the deflection of a first portion of the temple substrate and enable rotation of the first portion of the temple substrate about the horizontal span. The vertical portion is configured to dictate a torsional stiffness of a second portion of the temple assembly.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 4 illustrates the eyewear of FIG. 1 worn in combination with example additional equipment;

FIG. 8A illustrates a section view of the insert of FIG. 7A implemented on a user;

FIG. 8B illustrates another section view of the insert of FIG. 7A implemented on a user;

DESCRIPTION OF SOME EXAMPLE EMBODIMENTS

Some eyewear causes discomfort to the user during use due to pressure points imposed on the head of the user by temple assemblies of the eyewear. Specifically, as the temple assemblies extend back along the head of the user, the shape of the head may contact a portion of the temple assembly. At the point of contact, discomfort may result. Additionally, some eyewear attempts to eliminate the pressure points, but results in eyewear that is poorly retained to the head of the user. Accordingly, some embodiments disclosed herein include temple assemblies that reduce or eliminate pressure points while securely retaining the eyewear to the user.

Thus, these embodiments comfortably retain and secure the eyewear to the user. Some embodiments of the eyewear are configured such that it may be worn in combination with additional equipment such as hearing and head protection. In these and other embodiments, the temple assemblies are configured to reduce or eliminate discomfort due to pressure imposed against the ears or head of the user by the additional equipment while maintaining the function of the additional equipment and the eyewear.

The temple assemblies include a wave-shaped temple insert and a temple substrate. The insert may be at least partially located within the temple substrate. The insert is shaped to dictate a particular way in which the temple assembly conforms to a head of a user and conforms in response to forces imposed by the additional equipment and/or the head of the user. In particular, the insert may be shaped to apply one or more particular magnitudes of an inward force against the head, to dictate a particular range of deflection and/or allowable torsions along portions of the temple assemblies, to further dictate flexibility ranges along portions of the temple assemblies, and to dictate angles of deflection along portions of the temple assemblies.

The temple substrate is configured to support the insert and to conform to a contour to the head of the user. The temple substrate can conform along with some portions of the insert and/or rotate about some portions of the insert. Additionally, the temple substrate may provide a flexible cover to increase comfort of the user while wearing the eyewear. Some additional details of these and other embodiments are described with respect to the appended drawings.

Figure 1:
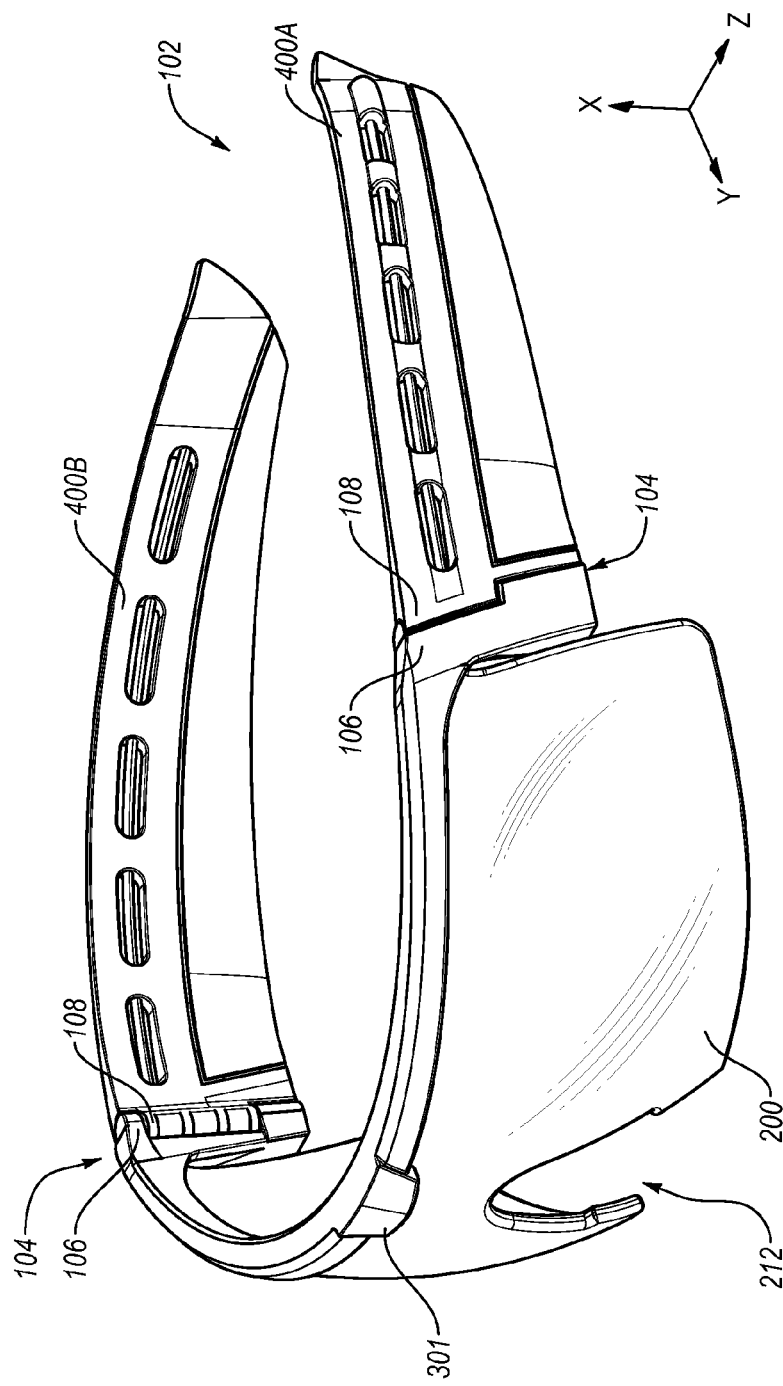
FIG. 1 illustrates an example of eyewear.

FIG. 1 illustrates example eyewear 100. The eyewear 100 may provide protection for a user (not shown) by placing a lens 200 between the eyes of the user and any material potentially introduced into the eyes of the user. Functionality of the eyewear 100 is not limited to protection of the eyes of the user. For example, the eyewear may be worn to reduce ambient lighting, for stylistic reasons, etc.

The eyewear 100 includes temple assemblies 400A and 400B (generally, temple assembly 400 or temple assemblies 400) that are configured to secure the eyewear to the head of the user, to retain the position of the eyewear on the head of the user, and to secure the eyewear and retain the position while maintaining general comfort of the user. Additionally, the eyewear 100 may be configured such that the temple assemblies 400 enable the user to wear the eyewear 100 in combination with additional equipment. For example, the eyewear 100 may enable the user to wear the eyewear 100 with head equipment and/or hearing/communication equipment. Some examples of the head equipment may include a combat helmet, a military helmet, a sporting helmet, headphones, a security helmet, a hard hat, and a safety helmet. Some examples of the hearing/communication equipment may include headphones for radio communication, protective hearing devices, circumaural headphones, supra-aural headphones, or noise-reducing ear cups. Some additional details of the eyewear 100 used with additional equipment are provided below.

The eyewear 100 may be symmetric with respect to a bisecting xy-plane in an arbitrarily-defined coordinate system. The symmetry of the eyewear 100 separates the overall structure of the eyewear 100 such that a left side of eyewear 100 is essentially identical, but a reflection of the right side of the eyewear. For example, a left temple assembly 400A, a left half of the lens 200, and a left half of a brow piece 301 may include substantially identical structures to a right temple assembly 400B, a right half of the lens 200, and a right half of the brow piece 301.

A head of the user may be introduced into a volume largely surrounded by the eyewear 100. The volume is generally indicated in FIG. 1 by arrow 102. With the head of the user introduced in the volume 102, the left temple assembly 400A may be oriented and/or positioned generally on a left side of the head of the user. Likewise, with the head of the user introduced in the volume 102, a right temple assembly 400B may be oriented and/or generally positioned on a right side of head of the user. As used herein, the right temple assembly 400B and the left temple assembly 400A may be generally referred to as temple assemblies 400 or the temple assembly 400.

The temple assemblies may be connected to the brow piece 301 by hinges 104A and 104B (generally, hinge 104 or hinges 104). Each of the hinges 104 may include a first portion 106 integrally formed to the brow piece 301 and a second portion 108 integrally formed in the one of the temple assemblies 400. In some embodiment, the first portion 106 is comprised of the same material as the brow piece 301 and the second portion 108 is comprised of the same material as the temple assemblies 400. The hinges 104 enable the rotation of the temple assemblies 400. For example, the hinges 104 may enable the temple assemblies 400 to rotate into the volume 102 to allow a user to store the eyewear 100.

The lens 200 may be comprised of one or more polymers, copolymer, reinforced polymers and/or polymer blends. Additionally, the lens 200 may include one or more functional lens coatings. The lens 200 may provide protection against penetration of material fragments, for instance. The lens 200 may be substantially transparent and may include a tint or a color in some embodiments. Additionally, the lens 200 may be configured such that a corrective (Rx) lens may be inserted between the eyes of the user and the lens 200 or the lens 200 may substantially include an Rx lens in some embodiments. The lens 200 may be sized to position the lens 200 within a specific distance from a user's face and may provide protection from material fragments entering the eyes of the user from the side. The lens 200 may be sized to allow the use of external optical equipment such as night vision goggles. For example, the night vision goggles may be attached to a helmet and may be rotated to be positioned in front of the lens 200 during use. The lens 200 may be sized to allow for use of the night vision goggles without interfering with the lens 200.

The lens 200 may be sized to cover the face and/or eyes of the user. Additionally, the lens 200 may be sized to accommodate external optical equipment and/or Rx lenses. The lens 200 may also define a nosepiece cutout 212. The nosepiece cutout 212 may be sized to receive a nosepiece (not shown). For example, the nosepiece cutout 212 may be sized to receive a commercially available or standardized nosepiece. The lens 200 may be attached to the brow piece 301 by one or more holes, protrusions, tabs, and the like. The holes, protrusions, tabs, and the like of the lens 200 may be sized to engage corresponding structures in the brow piece 301 to secure the lens 200 to the brow piece 301. Additionally, the holes, protrusions, tabs, and the like of the lens 200 may enable the lens 200 to be removed from the brow piece 301. By removing the lens 200 from the brow piece 301, a lens 200 having a different color or function may be attached to the brow piece 301 or a damaged lens 200 may be easily replaced.

The brow piece 301 may be connected to the temple assemblies 400 by the hinges 104 and secure the lens 200 to the eyewear 100. The brow piece 301 may generally extend along the forehead of a user when the user is wearing the eyewear 100. Additionally, the brow piece 301 may provide overall structural support for the eyewear 100.

The brow piece 301 may be comprised of one or more metals, one or more polymers, copolymer, reinforced polymers and/or polymer blends. The material selection may be based, at least partially, on considerations such as overall stresses imposed during use, durability during the life of the eyewear 100, etc. In some embodiments, the brow piece 301 may be comprised of nylon, a nylon resin such as nylon-66, a polypropylene, thermoplastic elastomer (TPE), a thermoplastic polyurethane (TPU), or another other suitable material. In other embodiments, the brow piece 301 may be comprised of an alternative material with similar chemical and/or mechanical properties. In other embodiments, the brow piece 301 may be comprised of an alternative material with similar chemical and/or mechanical properties.

In some embodiments, the brow piece 301 may be sized to accommodate a particular lens, such as lens 200. Additionally, the brow piece 301 may be sized to fit a common size of a group of users. For example, the brow piece 301 may be sized for one or more face-head morphologies and/or face sizes. The brow piece 301 may also be based on the portion of the face of the user the eyewear 100 protects. In some embodiments, the brow piece 301 may be sized to accommodate external optical equipment. Specifically, the brow piece 301 may position the eyewear 100 to reduce or eliminate interference with the external optical equipment. As above, an example of external optical equipment may include night vision goggles that may be positioned in front of the brow piece 301 during use. The brow piece 301 may also position the eyewear low enough on the head of a user to reduce or eliminate interference with headwear such as a helmet.

The brow piece 301 may also include the first portions 106 of the hinges 104. The first portions 106 may be integrally formed with the brow piece 301 and accordingly may be comprised of the same material as the brow piece 301. In some embodiments, the first portions 106 may be comprised of another material and affixed or otherwise attached to the brow piece 301.

Figure 2A:
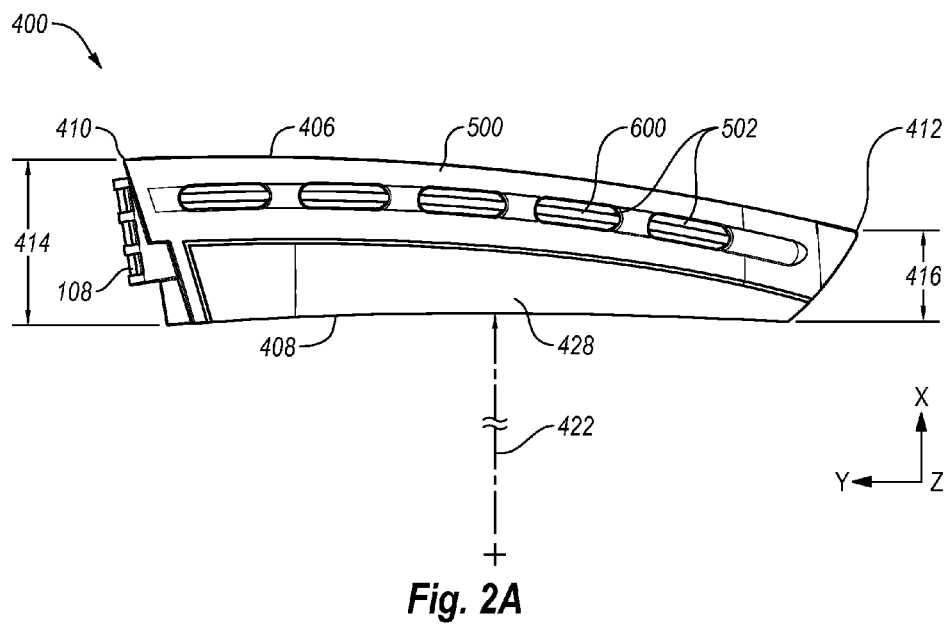
FIG. 2A illustrates an example temple assembly that may be implemented in the eyewear of FIG. 1.
Figure 2B:
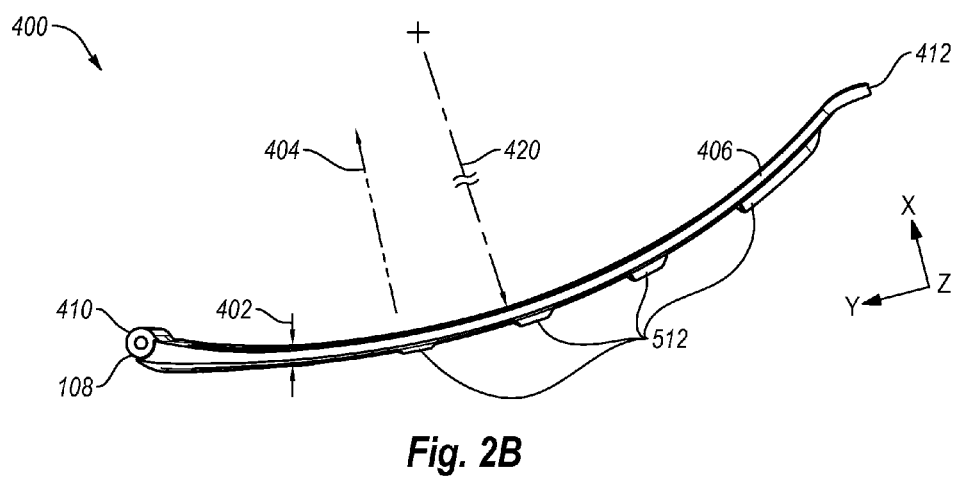
FIG. 2B illustrates another view of the temple assembly of FIG. 2A.
Figure 2C:
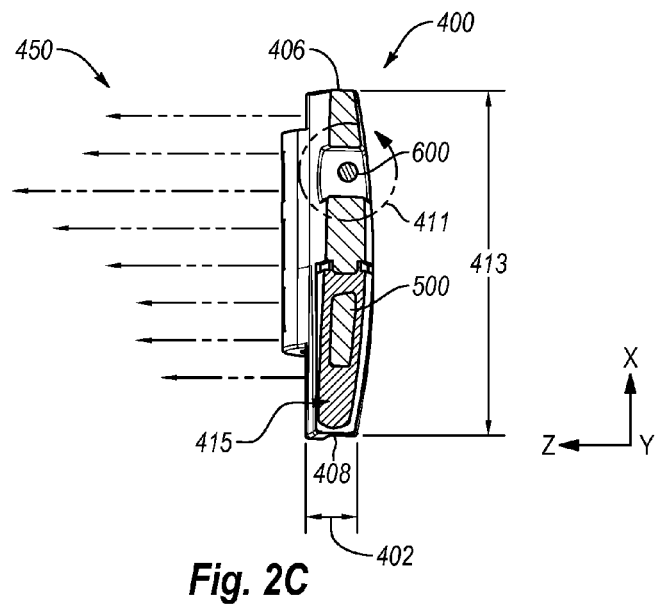
FIG. 2C illustrates another view of the temple assembly of FIG. 2A.

FIGS. 2A-2C illustrate some additional details of the temple assemblies 400 that may be implemented in the eyewear 100 of FIG. 1. FIGS. 2A-2C illustrate the left temple assembly 400A, however the right temple assembly 400B includes similar features and components in a symmetric structure. Specifically, FIG. 2A depicts a side view of the temple assembly 400, FIG. 2B depicts a top view of the temple assembly 400, and FIG. 2C depicts a section view of the temple assembly 400.

With combined reference to FIGS. 2A-2C, the temple assembly 400 includes a temple substrate 500, a covered portion 428, and an insert 600. As best depicted in FIG. 2A, the insert 600 may be positioned within the temple substrate 500 and the covered portion 428 may be formed onto the temple substrate 500.

The insert 600, located within the temple substrate 500, may provide a spring force to at least partially secure eyewear, such as the eyewear 100 of FIG. 1, to the head of a user. Additionally, the insert 600 may at least partially retain the position of the eyewear 100 to the head of the user. The spring force may generally act in the direction indicated by arrow 404 in FIG. 2B. The arrow 404 is substantially normal to the insert 600. While a single arrow 404 is depicted in FIG. 2B, the spring force acts substantially normally along the length of the insert 600, thereby providing a substantially even distribution of the spring force against the head of the user. As used herein, the direction of the arrow 404 is referenced to as "inward" and generally refers to a direction towards the head of a user. Conversely, the term "outward" generally refers to a direction opposite of the arrow 404 and away from the head of a user.

The spring force may additionally be distributed along a temple height 413 of the temple assembly 400. The temple height 413 may include a general or intermediate height of the temple assembly 400. Referring to FIG. 2C, the spring force may be primarily imposed by the insert 600 by the temple substrate 500. The covered portion 428 may distribute the spring force. An example distribution of the spring force along the height of the temple assembly 400 is represented in FIG. 2C by arrows 450. The longer arrows represent portions of the spring force having a higher magnitude.

The temple substrate 500 may rotate or bend about the insert 600. That is, the temple substrate 500 may rotate axially about the insert 600 enabling the temple substrate 500 to conform and/or deform at least partially independently of the insert 600. With reference to FIG. 2C, arrow 411 represents an axial rotation about the insert 600. Additionally or alternatively, the temple substrate 500 may bend about the insert 600. For example, when the insert 600 includes a flat strip of material, the temple substrate 500 may bend about the insert 600. Bending about the insert 600 may include deformation in substantially the z and negative z directions (e.g., inward and/or outward).

The rotation and/or bending about the insert 600 may be caused by a shape of the head of a user or by interference with additional equipment worn in combination with eyewear including the temple assembly 400. For example, when eyewear including the temple assembly 400 is not being worn, a temple assembly top 406 and a temple assembly bottom 408 may be aligned. However, when a user is wearing the eyewear including the temple assembly 400, the temple assembly top 406 may rotate inward and/or the temple assembly bottom 408 may rotate outward about the insert 600 to conform to the head of the user.

Additionally, the temple substrate 500 may rotate and/or bend about the insert 600 different amounts between a first end 410 of the temple assembly 400 and a second end 412 of the temple assembly 400. For example, at or around the first end 410, the temple substrate 500 may not rotate and the temple assembly top 406 may be substantially aligned with the temple assembly bottom 408. At or around the second end 412, the temple substrate 500 may rotate or bend about the insert 600 such that the temple assembly top 406 may be substantially aligned with the temple assembly bottom 408. Rotating or bending about the insert 600 may be enabled due to a lack of permanent attachment between at least some portion of the insert 600 and the temple substrate 500. For example, the insert 600 may be permanently attached at or around the first end 410 and the second end 412, but not permanently attached between the first end 410 and the second end 412.

In some embodiments, the insert 600 and the temple substrate 500 may be permanently attached along the entire insert 600. In these and other embodiments, a similar rotation or bending may be enabled due to materials in which the insert 600 and the temple substrate 500 are comprised. For example, the insert 600 may be comprised of a first material that is substantially rigid and super elastic while the temple substrate 500 may be comprised of a second material that is substantially flexible compared to the first material. The temple substrate 500 may accordingly bend and/or rotate about the insert 600.

In addition, the rotation or bending about the insert 600 may be due to an aspect ratio of the temple assembly 400. For example, with reference to FIG. 2C, the insert 600 may be positioned closer to the temple assembly top 406 than to the temple assembly bottom 408. Accordingly a free portion 415 that includes the temple assembly bottom 408 may rotate or bend about the insert 600 in the z and negative z direction. In some embodiments, the insert 600 is located about two-thirds of the temple height 413 to about three-fourths of the temple height 413 from the temple assembly bottom 408. Moreover, an assembly thickness 402 may decrease from the temple assembly top 406 to the temple assembly bottom 408. Thus, as a distance from the insert 600 increases, a magnitude of a pressure or a force to rotate or bend the temple substrate 500 may decrease.

Generally, rotating or bending about the insert 600 may contribute to comfort or reduce discomfort of the user while wearing eyewear including the temple assembly 400 or the eyewear in combination with additional equipment. For example, a user may wear the eyewear including the temple assembly 400 in conjunction with circumaural headphones. In this and other examples, the temple substrate 500 may not rotate about the insert 600 near the first end 410. However, a portion of the temple substrate 500 over which the circumaural headphones fit may rotate about the insert 600 such that temple substrate is substantially flat against the head of the user to reduce or eliminate discomfort caused by material pressed against the ears of the user. Additionally, in this example, the functionality of the circumaural headphones and the eyewear is maintained both while both are worn and if one of the circumaural headphones or the eyewear is removed.

Additionally, the rotating or bending about the insert 600 may also contribute to the retention of the eyewear 100 during use. By conforming to the head of the user, a majority of the temple assembly may be in contact with the head of the user. Accordingly, the eyewear 100 may maintain position on the head of the user during shifting or rotation of the head. In some embodiments, there may be additional rotation and/or bending of the temple assembly 400 at or around the hinge 104 of FIG. 1. Specifically, the temple substrate 500 rotates or bends in relationship to the brow piece 301 and/or the lens 200 disclosed herein.

As best depicted in FIGS. 2A and 2B, the temple assembly 400 may also include an inward curve 420 and/or a downward curve 422 from the first end 410 to the second end 412. The inward curve 420 and the downward curve 422 are represented on FIGS. 2A and 2B respectively by an X and a line indicating a center point and a radius. While the inward curve 420 and the downward curve 422 include a single radius, the inward curve 420 and/or the downward curve 422 may include one or more curvatures between the first end 410 and the second end 412 without limitation. For example, the inward curve 420 may include a first radius during a first portion of the temple assembly 400 and a second radius during a second portion of the temple assembly.

In some embodiments, the inward curve 420 and the downward curve 422 may contribute to the stability, functionality, and/or comfort of eyewear including the temple assembly 400. For example, the inward curve 420 may at least partially provide an inward force against the head of a user. Additionally, the downward curve 422 may move the position of the eyewear, including the temple assembly 400, away from the ears of a user up higher on the head of the user. The inward curve 420 and/or the downward curve 422 may distort or change. For example, when the temple substrate 500 rotates or bends about the insert 600, the inward curve 420 and/or the downward curve 422 may distort.

Additionally or alternatively, the temple assembly 400 may narrow or taper in height from the first end 410 to the second end 412. Referring to FIG. 2A, the temple assembly 400 may include a first temple height 414 at the first end 410, which may be greater than a second temple height 416 at the second end 412. Like the inward curve 420 and/or the downward curve 422, the first temple height 414 being greater than the second temple height 416 may contribute to the stability, functionality, and/or comfort of eyewear including the temple assembly 400.

As best shown in FIG. 2B, the temple assembly 400 may also include the assembly thickness 402. Generally, the assembly thickness 402 may vary from the first end 410 to the second end 412 and from the temple assembly top 406 to the temple assembly bottom 408. In this and other embodiments, the assembly thickness 402 at the first end 410 is greater than the assembly thickness 402 at the second end 412. Specifically, the assembly thickness 402 tapers from the first end 410 to the second end 412. Additionally, in this and other embodiments, the assembly thickness 402 at the temple assembly top 406 is greater than the assembly thickness 402 at the temple assembly bottom 408. Specifically, the assembly thickness 402 tapers from the temple assembly top 406 to the temple assembly bottom 408.

Additionally in some embodiments, the assembly thickness 402 may be related to one or more insert supports 512. The insert supports 512 may support the insert 600 such that the assembly thickness 402 may be reduced. For example, the insert 600 may be a limiting structure in reducing the assembly thickness 402. By including the insert supports 512, the assembly thickness 402 may be reduced while supporting the insert 600 in the temple substrate 500. Accordingly, at one or more portions of the temple assembly 400, the thickest portion of the assembly thickness 402 may correspond to the location of the insert supports 512.

With specific reference to FIG. 2A, the insert 600 is shown located within the temple substrate 500. The insert 600 includes a mechanical interlock (602 in FIG. 3 below) at least partially secured in the temple substrate 500. The mechanical interlock may at least partially anchor the insert 600 within the temple substrate 500. For example, in some embodiments, the insert 600 may be substantially a wire. The mechanical interlock 602 may prevent the entire insert 600 from rotating relative to the brow piece 301 and/or the temple substrate 500 during use.

Additionally, in some embodiments, the mechanical interlock 602 is not included in the second portion 108 of the hinge 104 of FIG. 1. Instead, the second portion 108 is integrally formed as part of the temple substrate 500, set away from the hinge 104. By not including the insert 600 in the second portion 108 of the hinge 104, the insert 600 may provide the spring force 404, but the location of the insert 600 in the temple substrate 500 may vary. For example, the insert 600 may be located near the temple assembly top 406.

The covered portion 428 may be formed on the temple substrate 500. For example, the covered portion 428 may be overmolded onto the temple substrate 500. The covered portion 428 may increase the comfort of eyewear including the temple assembly 400. Specifically, the covered portion 428 may create the temple assembly bottom 408 and may be comprised of a material that is soft and flexible compared to the insert 600 and/or the temple substrate 500. During use, the covered portion 428 may rest along the head of a user and/or behind the ears of the user. The covered portion 428 may be substantially flexible to conform and/or deform with the temple substrate 500 independently of the temple substrate 500. Additionally, the covered portion 428 may be thinner than the assembly thickness 402. Specifically, in some embodiments, the covered portion 428 may be the thinnest portion of the temple assembly 400.

The temple substrate 500, the covered portion 428, and the insert 600 may be comprised of different materials. For example, in some embodiments, the insert 600 may be comprised of a first material having sufficient rigidity and elastic deformation properties to impose the spring force 404 to secure and retain the eyewear to the head of the user. The first material may additionally have elastic deformation properties allowing for the repeated elastic deformation during use of the eyewear. Thus, the first material may be stressed or bent repeatedly without plastically deforming. For example, the first material may be a metal or metal alloy such as nickel titanium that may include a pre-loaded spring force as discussed above.

The temple substrate 500 may be comprised of a second material that may allow rotation and/or bending about the insert 600 but also provide some support for the overall structure of the temple assembly 400. In some embodiments, the temple substrate 500 is comprised of one or more polymers, copolymer, reinforced polymers and/or polymer blends. For example, the temple substrate 500 may be comprised of a nylon-66 or a nylon-12.

The covered portion 428 may be comprised of a third material that provides comfort when in contact with the head and/or the ears of a user. Additionally, the third material may be flexible compared to the temple substrate 500 and the insert 600 to easily contour to the head and/or ears of the user. The third material may be selected at least partially based on considerations including comfort, flexibility, ease of formation onto the temple substrate 500, etc. In some embodiments, the covered portion 428 is comprised of one or more polymers, copolymer, reinforced polymers and/or polymer blends. For example, the covered portion 428 may be comprised of a thermoplastic elastomer. The third material and the second material do not have to be a completely different material. For example, the third material and the second material may be the same except the third material may include a different durometer than the second material.

In some embodiments, the covered portion 428 may be integrally formed with the temple substrate 500. For example, the temple substrate 500 may include a portion that includes one or more characteristics of the covered portion 428. In these and other embodiments, the materials of the temple substrate 500 and the integral covered portion 428 may be different materials permanently molded together or may be the same material.

The temple substrate 500 defines the insert holes 502. The insert holes 502 (FIG. 2A only) and other structural holes may reduce the overall weight and/or rigidity of the temple substrate 500. Additionally, the insert holes 502 may provide relief between the insert 600 described in this disclosure and the temple substrate 500.

Figure 3:
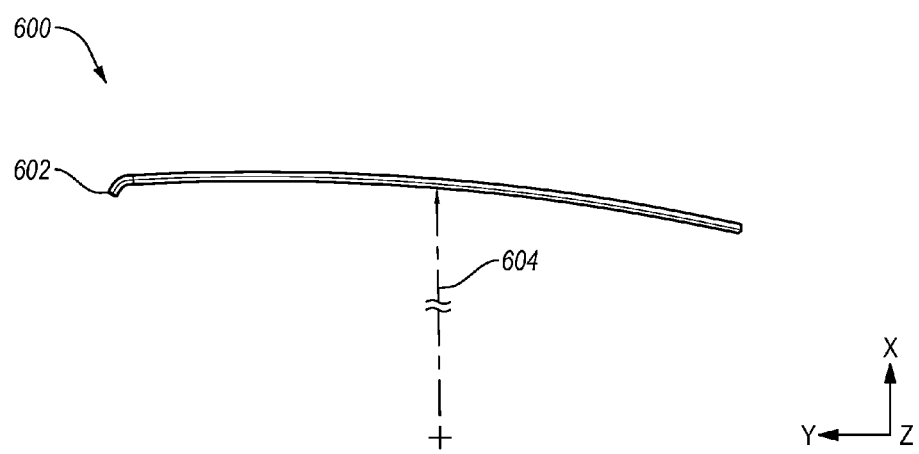
FIG. 3 illustrates an example insert that may be implemented in the eyewear of FIG. 1.

FIG. 3 illustrates some additional details of the insert 600 that may be implemented in the temple assembly 400 of FIGS. 2A-2C. In some embodiments, the insert 600 generally includes a cylindrical rod, a wire, or a curved plate, for instance. Accordingly, the insert 600 may include a cross-sectional shape such as a circle, an oval, or a rectangular cross sectional shape. The cross-sectional shape may include an irregular or asymmetric shape. In some of these embodiments, the temple substrate 500 may bend about the insert 600 rather than rotating about the insert 600.

The insert 600 may be formed, forged, or bent such that the insert 600 includes an insert inward curvature which may substantially correspond to the inward curve 420 of FIG. 2B, an insert downward curvature 604, and the mechanical interlock 602 that is mentioned above. The insert downward curvature 604 is represented by an X and a line indicating a center point and a radius. The insert downward curvature 604 may substantially correspond to the downward curve 422 of FIG. 2A. During use, the insert inward curvature and/or the insert downward curvature 604 may deform or contour as discussed above.

The mechanical interlock 602 may at least partially secure the insert 600 within the temple substrate 500 discussed elsewhere in this disclosure. The mechanical interlock 602 may include a portion of the insert 600 adequate to prevent the rotation of the entire insert 600 in the temple substrate 500. In some embodiments, for example, about 3% of the insert 600 may be included in the mechanical interlock 602. The insert downward curvature 604, the insert inward curvature, the mechanical interlock 602, or any combination thereof may be bent or formed in the insert 600 through a bending process. Alternatively, the insert downward curvature 604, the insert inward curvature, the mechanical interlock 602, or any combination thereof may be extruded or stamped.

FIG. 4 illustrates the eyewear 100 of FIG. 1 worn in combination with additional equipment. Specifically, FIG. 4 depicts a side view of the eyewear 100 worn in combination with circumaural ear cups 700 (hereinafter, "ear cups"). The ear cups 700 in FIG. 4 are depicted transparently to show an ear 702 of a user. The ear cups 700 are included in FIG. 4 as a non-limiting example of the additional equipment that may be used in conjunction with the eyewear 100. In some embodiments, one or more features of the additional equipment may additionally be positioned between the eyewear 100 and the head of the user. For example, a strap securing a helmet may be positioned between the eyewear 100 and the head of the user.

The embodiment of FIG. 4 includes the covered portion 428, the temple substrate 500, the temple assembly 400, and the insert 600 which are described above. The description of the covered portion 428, the temple substrate 500, the temple assembly 400, and the insert 600 are not repeated here.

As depicted in FIG. 4, when a user wears the ear cups 700 with the eyewear 100, the ear cups 700 may apply pressure to at least some portion of the ear 702. Generally, the ear cups 700 apply an inward force that secures the ear cups 700 to the head of the user. Thus, the ear cups 700 may press on a top or an upper portion 711 of the ear 702 that may retain the eyewear 100. The ear cups 700 may deform the ear 702 against the temple assembly 400.

However, any discomfort that may result from deforming the ear 702 is reduced because the ear cups 700 apply pressure to the covered portion 428, which may correspond to the thinnest portion of the temple assembly 400. More specifically, the insert 600, which may correlate to the thickest portion of the temple assembly 400, may be located inside the temple substrate 500 above the ear 702. The insert 600 thus provides the spring force to secure the eyewear 100 to the head of the user but may not rest behind the ear 702 or any portion thereof to which pressure is applied by the ear cups 700. Accordingly, any discomfort caused by the ear cups 700 applying pressure to the ear 702 is reduced or eliminated.

Figure 5A:
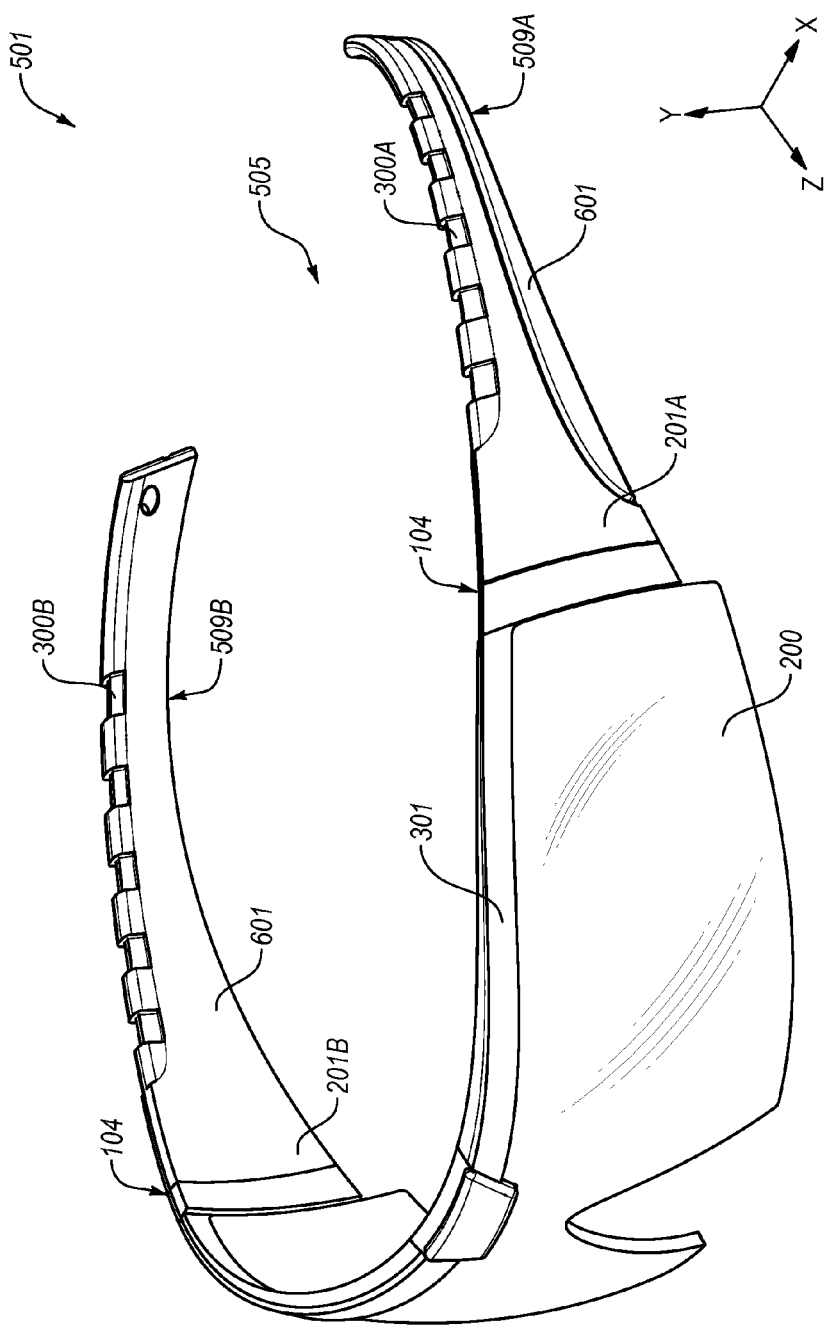
FIG. 5A illustrates another example of eyewear.
Figure 5B:
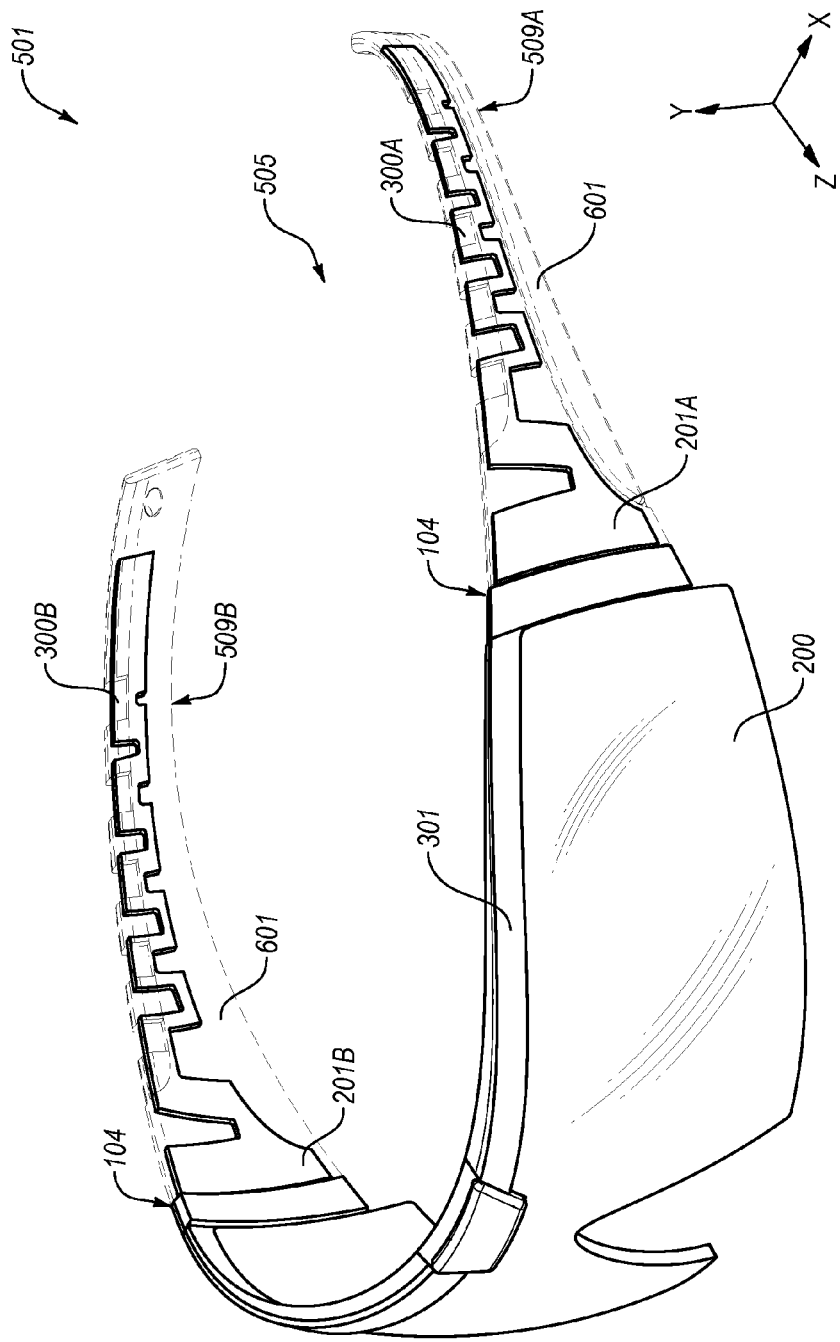
FIG. 5B illustrates another view of the eyewear of FIG. 5A.

FIGS. 5A and 5B illustrate an example of eyewear 501. FIG. 5A depicts the eyewear 501 with solid temple substrates 601A and 601B (generally, temple substrate 601 or temple substrates 601) of temple assemblies 201A and 201B (generally, temple assembly 201 or temple assemblies 201). FIG. 5B depicts the eyewear 501 with transparent temple substrates 601. The eyewear 501 may be similar to the eyewear 100 discussed with reference to FIGS. 1-4. For example, the eyewear 501 may provide protection for a user (not shown) by placing the lens 200 between the eyes of the user and any material potentially introduced into the eyes of the user. Functionality of the eyewear 501 is not limited to protection of the eyes of the user. For example, the eyewear 501 may be worn to reduce ambient lighting, for stylistic reasons, etc.

The eyewear 501 includes the temple assemblies 201 that are configured to secure the eyewear to the head of the user, to retain the position of the eyewear on the head of the user while maintaining general comfort of the user. The temple assemblies 201 include inserts 300A and 300B (generally, insert 300 or inserts 300). The inserts 300 may be shaped to conform to the head of the user and to allow the temple assemblies 201 to be thin when compared to temple assemblies that do not include the inserts 300. Additionally, the inserts 300 are shaped to allow particular torsional stiffness and particular deflections along certain portions of the temple assemblies 201. The particular torsional stiffness and the particular deflections may accommodate varying head shapes of the users and various types of additional equipment. The relatively thin temple assemblies 201 (when compared to temple assemblies not having the inserts 300) may enable use of the eyewear 501 in combination with additional equipment. For example, the eyewear 501 may enable the user to wear the eyewear 501 with head equipment and/or hearing/communication equipment described elsewhere in this disclosure.

The eyewear 501 may be symmetric with respect to a bisecting yz-plane in an arbitrarily-defined coordinate system. The symmetry of the eyewear 501 separates the overall structure of the eyewear 501 such that a left side of the eyewear 501 is essentially identical, but a reflection of the right side of the eyewear. For example, a left temple assembly 201A includes substantially identical structures to a right temple assembly 201B.

The head of the user may be introduced into a volume largely surrounded by the eyewear 501. The volume is generally indicated in FIGS. 5A and 5B by arrow 505. With the head of the user introduced in the volume 505 and the eyes of the user facing the lens 200, the left temple assembly 201A may be oriented and/or positioned generally on a left side of the head of the user. The right temple assembly 201B may be oriented and/or generally positioned on a right side of the head of the user. Additionally, the temple assemblies 201 may generally run along sides of the head of the user above the ears of the user. For instance, bottom surfaces 509A and 509B of the temple assemblies 201 may be positioned above a connection (e.g., 711 of FIG. 4) between the head of the user and the ears of the user. The temple assemblies 201 or a portion thereof may be positioned between the head of the user and the helixes of the ears of the user.

Figure 6A:
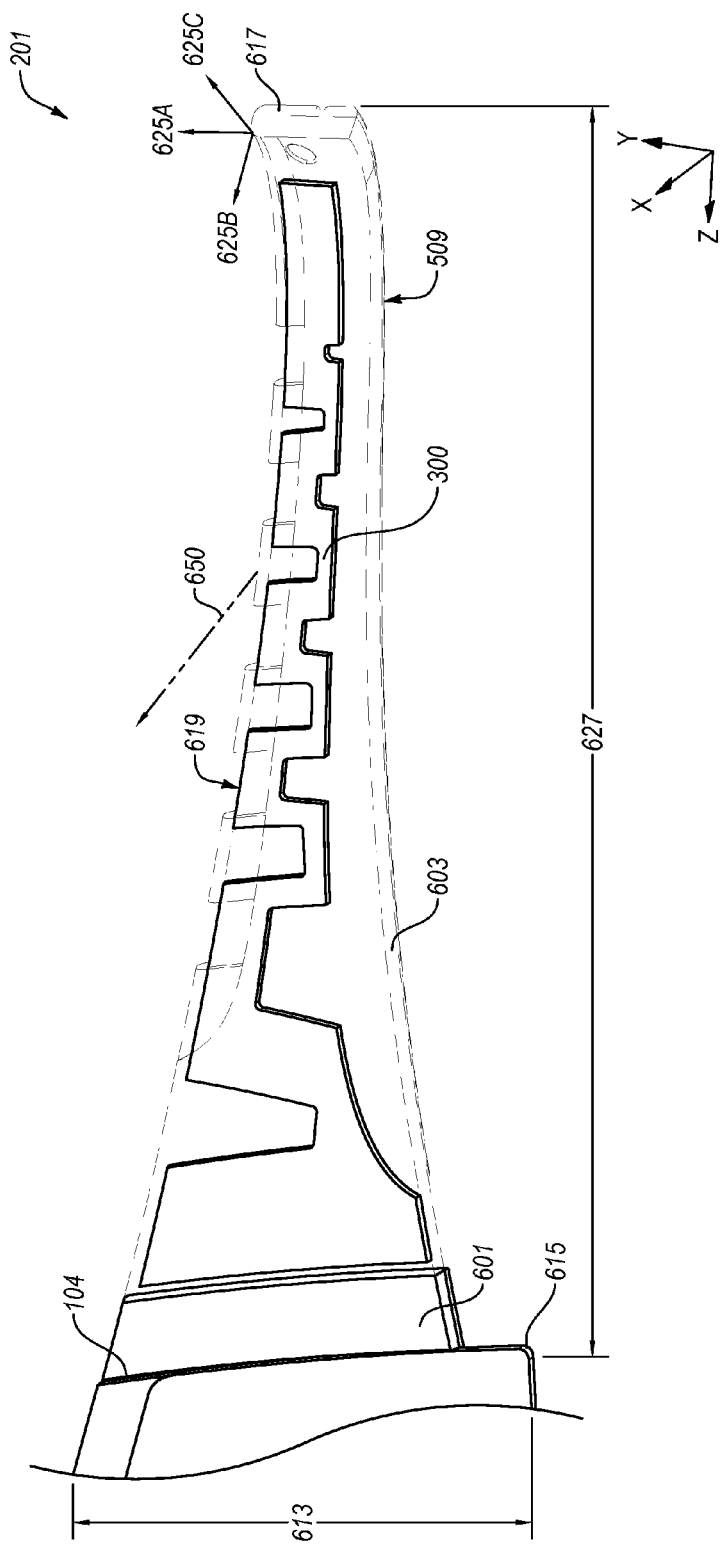
FIG. 6A illustrates an example temple assembly that may be implemented in the eyewear of FIGS. 5A and 5B.
Figure 6C:
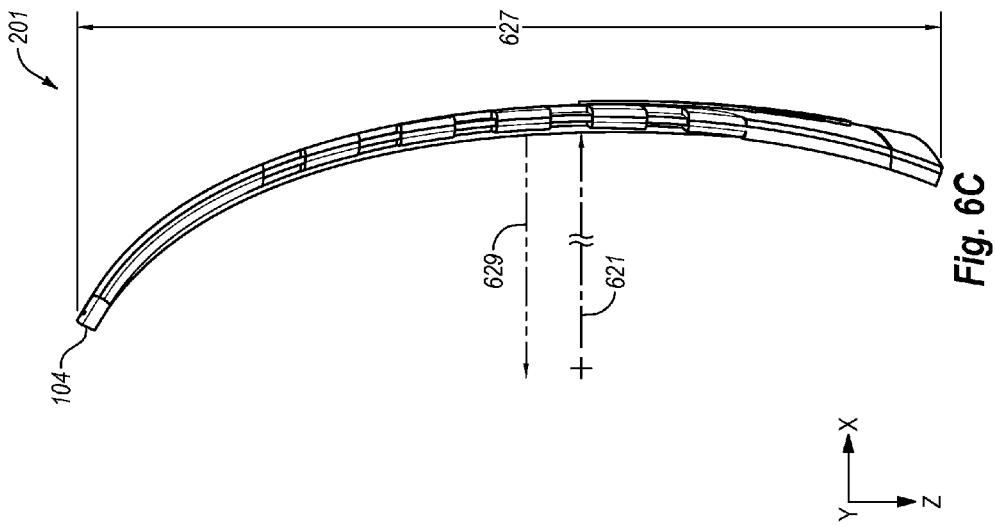
FIG. 6C illustrates another view of the temple assembly of FIGS. 5A and 5B.
Figure 6B:
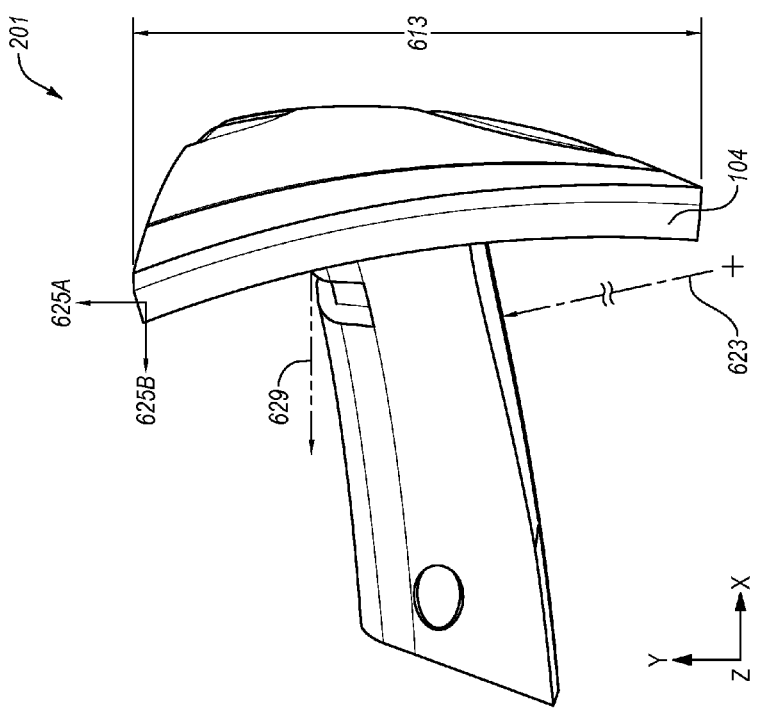
FIG. 6B illustrates another view of the temple assembly of FIGS. 5A and 5B.

FIGS. 6A-6C illustrate some additional details of an example of the left temple assembly 201A that may be implemented in the eyewear 501 of FIGS. 5A and 5B. FIGS. 6A-6C illustrate the left temple assembly 201A (hereinafter referred to as temple assembly 201); however, the right temple assembly 201B includes similar features and components in a symmetric structure. Specifically, FIG. 6A depicts a transparent side view of the temple assembly 201. FIG. 6B depicts a rear view of the temple assembly 201. FIG. 6C depicts a top view of the temple assembly 201.

With reference to FIG. 6A, the temple assembly 201 includes a temple substrate 601, a covered portion 603, and the insert 300. The insert 300 may be positioned within the temple substrate 601. The covered portion 603 may be formed onto a bottom portion of the temple substrate 601. Alternatively, the covered portion 603 or some portion thereof may be integrally formed on the temple substrate 601. Generally, the bottom surface 509 of the temple substrate 601 may rest on or against a connection between an ear and a head of a user.

The temple substrate 601 may be comprised of a second material that may allow rotation and/or bending about the insert 300 and also provide some support for the overall structure of the temple assembly 201. In some embodiments, the temple substrate 601 is comprised of one or more polymers, copolymers, reinforced polymers, and/or polymer blends. For example, the temple substrate 601 may be comprised of a nylon-66, a nylon-12, polypropylene, TPE, TPU, or another other suitable material.

The covered portion 603 may be comprised of a third material that provides comfort when in contact with the head and/or the ears of a user. Additionally, the third material may be flexible compared to the temple substrate 601 and/or the insert 300 to easily contour to the head and/or ears of the user. The third material may be selected at least partially based on considerations including comfort, flexibility, ease of formation onto the temple substrate 601, and the like. In some embodiments, the covered portion 603 is comprised of one or more polymers, copolymers, reinforced polymers, and/or polymer blends. For example, the covered portion 603 may be comprised of a thermoplastic elastomer. The third material and the second material are not different in all embodiments. For example, the third material and the second material may be the same except the third material may include a different durometer than the second material.

The temple assembly 201 may generally curve in an inward direction which is defined as a direction oriented towards the head of the user and represented in FIG. 6A by arrow 650. The inward direction is similarly defined above with reference to arrow 404 of FIG. 2B. Additionally, a height 613 of the temple assembly 201 may narrow from a first end 615, which substantially corresponds to the hinge 104, to a second end 617. The amount that the temple assembly 201 narrows may vary between embodiments. For example, the height 613 at the first end 615 may be about twice the height 613 at the second end 617 in some embodiments. In other embodiments, the height 613 at the first end 615 may be about three times the height 613 at the second end 617.

The temple assembly 201 may define multiple insert holes 619. In FIG. 6A, only one of the insert holes 619 is labeled. The insert holes 619 may reduce the weight of the temple assembly 201 and may provide relief at certain portions of the temple substrate 601, which may allow some additional flexibility. Additionally, the insert holes 619 may expose one or more portions of the insert 300.

The temple substrate 601 may include a substrate inward curvature 621 (FIG. 6C) and a substrate downward curvature 623 (FIG. 6B). The substrate inward curvature 621 and the substrate downward curvature 623 are represented by an 'X' and a line indicating a center point and a radius. During use, the substrate inward curvature 621 and/or the substrate downward curvature 623 may deform or contour as discussed elsewhere in this disclosure.

The temple substrate 601 and/or the covered portion 603 may be substantially flexible. For example, the temple substrate 601 and/or the covered portion 603 may flex, deflect, and rotate, (collectively, flex) in or about a first, a second, and a third direction, represented by arrows 625A-625C in FIG. 6A.

In particular, the temple substrate 601 and/or the covered portion 603 may flex in one or more of the directions 625A-625C to various degrees along a length 627 of the temple substrate 601. For example, at a first length from the hinge 104, the temple substrate 601 and/or the covered portion 603 may flex a first amount in the first direction 625A. At a second length from the hinge 104, the temple substrate 601 and/or the covered portion 603 may flex in a second amount in the second direction 625B.

Additionally, along the height 613 of the temple assembly 201, the temple substrate 601 may flex in one or more of the directions 625A-625C to differing degrees and may rotated about axes parallel to one or more of the directions 625A-625C to differing degrees. For instance, at a first height from the bottom surface 509 and a third length from the hinge 104, the temple substrate 601 and/or the covered portion 603 may rotate a first amount in the second direction 625B about an axis parallel to the third direction 625C. At a second height from the bottom surface 509 and a fourth length from the hinge 104, the temple substrate 601 and/or the covered portion 603 may rotate a second amount in a direction substantially opposite the second direction 625B about an axis parallel to the third direction 625C. Accordingly, the temple assembly 201 may be configured to flex in a way which may vary along the height 613 and along the length 627.

Generally, the flexibility of the temple substrate 601 may contribute to comfort or reduce discomfort of the user while wearing eyewear including the temple assembly 201. Additionally, flexing of the temple substrate 601 may reduce discomfort imposed by the eyewear when worn in combination with additional equipment. For example, a user may wear the eyewear including the temple assembly 201 in conjunction with circumaural headphones (e.g., 700 of FIG. 4). The portions of the temple substrate 601 over which the circumaural headphones fit may flex such that the temple substrate 601 is substantially flat against the head of the user, which may reduce or eliminate discomfort caused by material pressed against the ears of the user. Additionally, in this example, the functionality of the circumaural headphones and the eyewear is maintained while both are worn and if one of the circumaural headphones or the eyewear is removed.

Additionally, the flexibility of the temple assembly 201 may contribute to the retention of the eyewear during use. By conforming to the head of the user, a majority of the temple assembly 201 may be in contact with the head of the user. Thus, the eyewear may maintain position on the head of the user during shifting or rotation of the head.

The insert 300 may dictate, at least partially, the degree and/or direction of the flex of the temple assembly 201. For example, with reference to FIGS. 6A-7C, the insert 300, located within the temple assembly 201, may provide the spring force to at least partially secure eyewear, including the temple assembly 201, to the head of a user. Additionally, the insert 300 may at least partially retain the position of the eyewear with respect to the head of the user. The spring force may generally act in the direction indicated by arrow 629 in FIGS. 6B and 6C.

As described with reference to arrow 404 of FIG. 2B, the arrow 629 is substantially normal to the insert 300. While a single arrow 629 is depicted in FIGS. 6B-7C, the spring force acts substantially normally along the length of the insert 300. The spring force may vary at different points along a length 325 of the insert 300 based on the shape of the insert 300, some details of which are provided below. The spring force may thus provide a specific distribution of the spring force against the head of the user. As discussed elsewhere in this disclosure, the direction of the arrow 629 is referenced to as "inward" and generally refers to a direction towards the head of a user. For instance, the direction "inward" may be in a first direction when discussed in reference to a left temple assembly (e.g., 201A of FIGS. 5A and 5B) and in a second direction, opposite the first direction when discussed in reference to a right temple assembly (e.g., 201B of FIGS. 5A and 5B). Conversely, the term "outward" generally refers to a direction opposite of the arrow 629 and away from the head of a user.

Figure 7A:
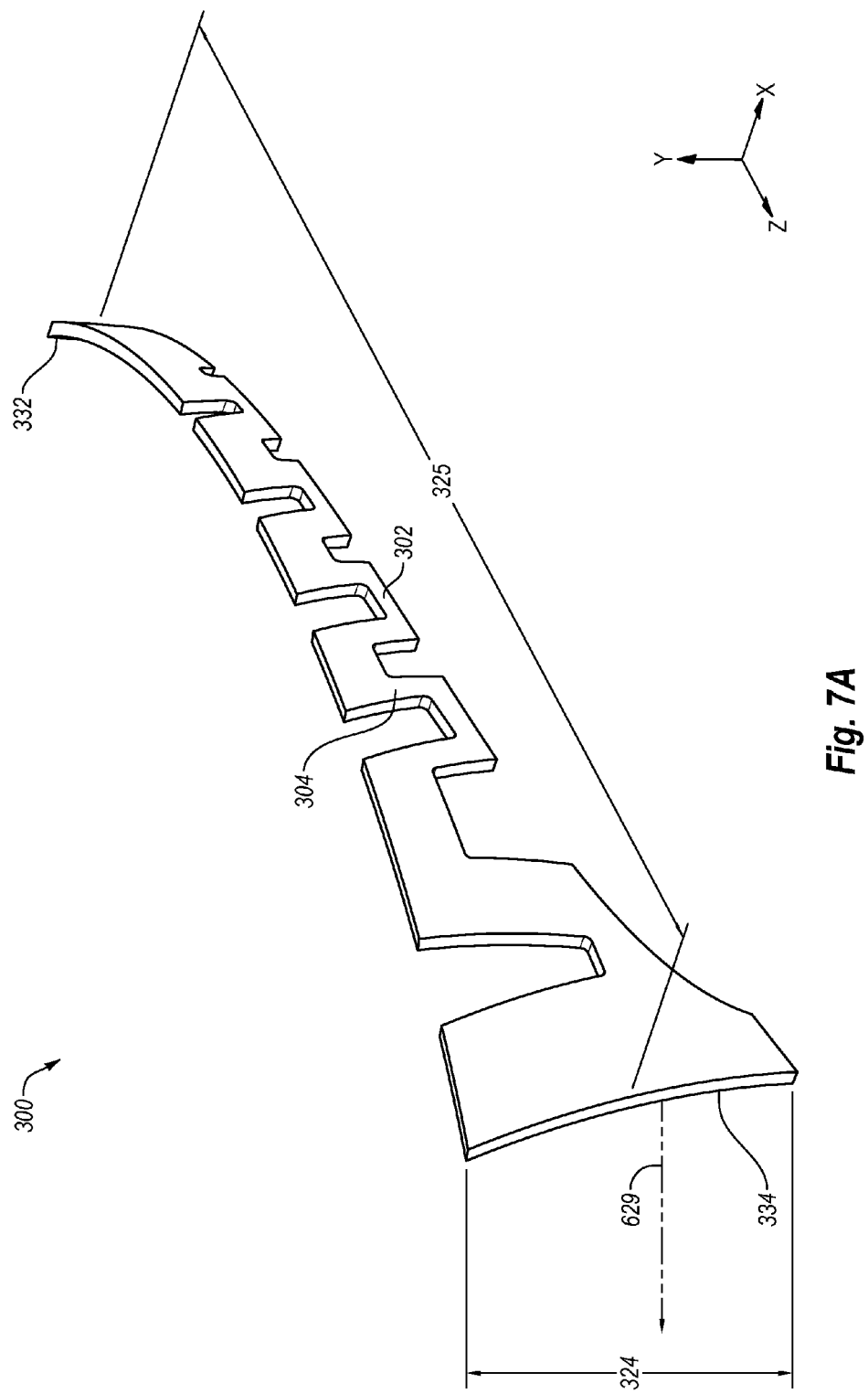
FIG. 7A illustrates an example insert that may be implemented in the temple assembly of FIGS. 6A-6C.
Figure 7C:
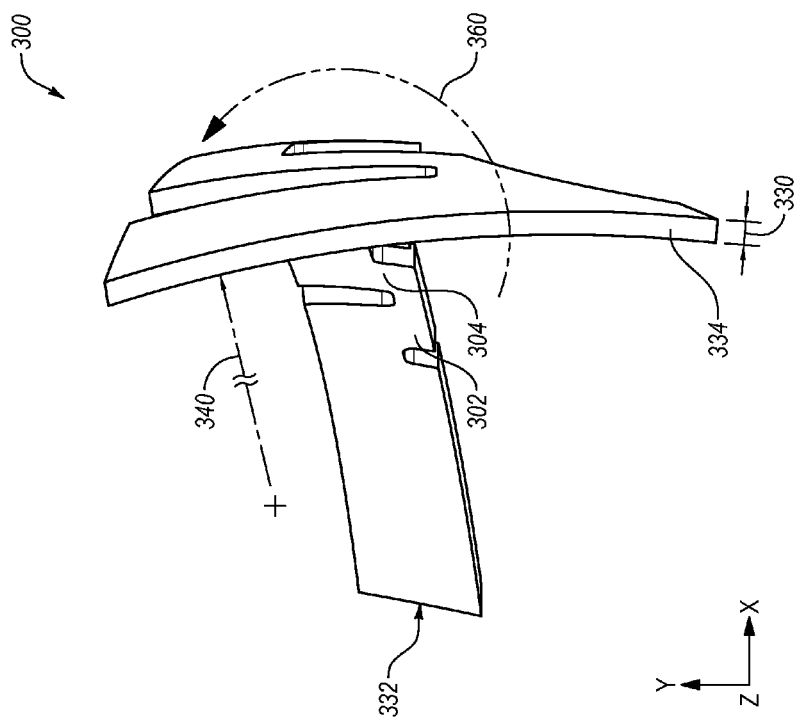
FIG. 7C illustrates another view of the insert of FIG. 7A.

With reference to FIGS. 6B, 7A, and 7C, the spring force may additionally be distributed along the height 613 of the temple assembly 201 and/or a height 324 of the insert 300. The spring force may be primarily imposed by the insert 300. However, the shape of the insert 300 may be configured to provide the spring force having one or more particular magnitudes imposed at one or more particular positions along the head of the user. The temple substrate 601 and/or the covered portion 603 may act to distribute the spring force somewhat over a larger portion of the head of the user.

The temple substrate 601, the covered portion 603, and the insert 300 may be comprised of different materials. For example, in some embodiments, the insert 300 may be comprised of a first material having sufficient rigidity and elastic deformation properties to impose the spring force to secure and retain the eyewear 501 to the head of the user. The first material may additionally have elastic deformation properties allowing for the repeated elastic deformation during use of the eyewear 501. Thus, the first material may be stressed or bent repeatedly without plastically deforming. For example, the first material may be a metal or metal alloy such as nickel titanium that may include a pre-loaded spring force as discussed above.

Figure 7B:
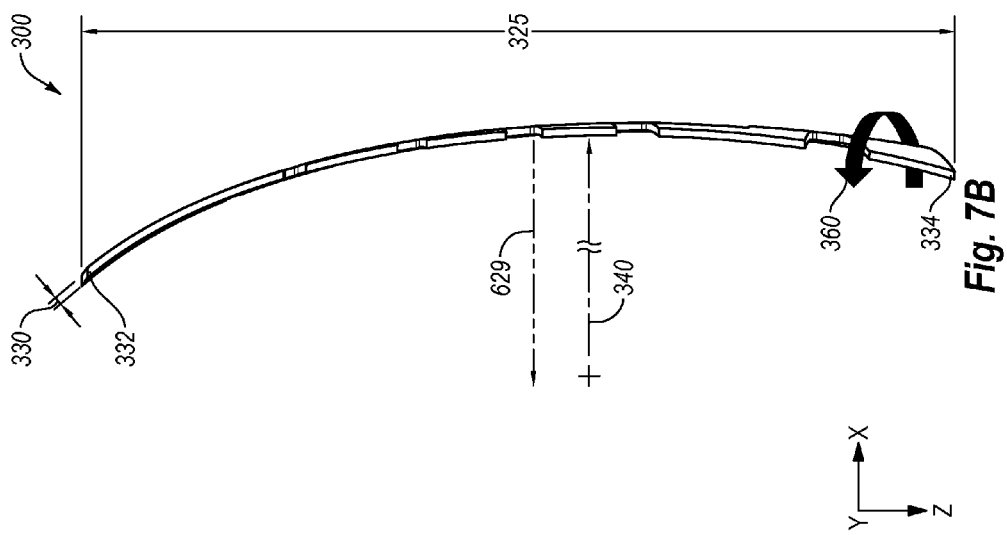
FIG. 7B illustrates another view of the insert of FIG. 7A.

With reference to FIGS. 7A-7C, some additional details of the insert 300 are illustrated. The insert 300 may be formed, forged, or bent such that the insert 300 includes an insert inward curvature 340 (FIGS. 7B and 7C). Additionally in some embodiments, the insert 300 may include an insert twist 360 (FIGS. 7B and 7C). Generally, the insert twist 360 may be about a longitudinal dimension of the insert 300. The longitudinal dimension may generally extend from a first end 334 to a second end 332. The insert inward curvature 340 is represented by an 'X' and a line indicating a center point and a radius. The insert inward curvature 340 may substantially correspond to the substrate inward curvature 621 of FIG. 6C. During use, the insert inward curvature 340 and the insert twist 360 may deform or contour as discussed in this disclosure.

In the embodiment depicted in FIGS. 6A-6C, the temple substrate 601 extends from the hinge 104 to the second end 617. In some embodiments, the temple substrate 601 may extend to some length between the hinge 104 and the second end 617. For example, the temple substrate 601 may extend about one-third of the length 627.

As best illustrated in FIGS. 7B and 7C, the insert 300 may include an insert thickness 330. The insert thickness 330 may be configured such that the temple assembly (e.g., 201 of FIGS. 6A-6C) may be thin, which may reduce discomfort when eyewear, including the insert 300, is worn in combination with additional equipment.

In the embodiment depicted in FIGS. 7A and 7C, the insert 300 includes a wave-shaped insert. The insert 300 includes horizontal spans 302 and vertical portions 304, only one each is labeled in FIGS. 7A and 7C. FIG. 8A depicts a section view across the horizontal span 302. FIG. 8B depicts a section view across the vertical portion 304. In addition, FIGS. 8A and 8B include a head 802 of a user. In addition, FIGS. 8A and 8B depict an ear 804 of the user to provide a representation of placement of the temple assembly 201 on the head 802 of the user. Generally, the temple assembly 201 may be positioned along a side of the head 802 and the bottom surface 509 may be placed on a connection between the head 802 and the ear 804.

With combined reference to FIGS. 7A, 7C, and 8B, the vertical portions 304 may provide resistance to rotation or bending about the insert 300. For example, the vertical portion 304 may provide resistance to rotation or bending in a clockwise or counterclockwise direction about one or more axes that are parallel to the z-axis. The rotation or bending about the insert 300 may be in a direction that corresponds to the arrow representing the insert twist 360 in FIG. 7C or in a direction rotationally opposite the insert twist 360. In particular, the vertical portions 304 may provide resistance to rotation or bending along some sections of the temple substrate 601 surrounding or adjacent to the vertical portions 304.

The vertical portions 304 may, however, provide little resistance to deflection or flex in substantially the x and negative x directions. Accordingly, during use, the head 802 of a user and/or additional equipment (not shown) may impose a pressure against the temple substrate 601 surrounding or adjacent to one of the vertical portions 304. The pressure may deflect the temple substrate 601 in the x or negative x directions, as generally indicated by arrow 808. The pressure may not rotate or bend the temple substrate 601 about the insert 300.

With combined reference to FIGS. 7A, 7C, and 8A, the horizontal span 302 may enable or may not provide as much resistance to rotation or bending about the insert 300 as the vertical portions 304. Accordingly, the temple substrate 601 surrounding or adjacent to the horizontal spans 302 may rotate or bend about the insert 300 in a clockwise or counterclockwise direction about one or more axes that are substantially parallel to the z axis. Rotation or bending about the horizontal span 302 is represented in FIG. 8A by arrow 806. The particular axis about which the rotation or bending occurs may be determined by a particular point of pressure imposed by the head 802 and/or additional equipment and one or more of the dimensions of the horizontal span 302.

The horizontal spans 302 may provide some resistance to flex or deflection in the x and negative x directions. Accordingly, during use, the head 802 of a user and/or additional equipment may impose a pressure against the temple substrate 601 surrounding or adjacent to one of the horizontal spans 302. The pressure may rotate or bend a portion of the temple substrate 601 about the insert 300, but may not flex or deflect the temple substrate 601 in the x or negative x direction.

A degree to which the temple substrate 601 rotates or bends about the insert 300 may be determined by a distance from the insert 300. For example, in FIG. 8A, in response to a force pressing on the substrate 601, at a first distance from the horizontals span 302 the temple substrate 601 may rotate a first amount. At a second distance from the horizontal span 302, the temple substrate 601 may rotate a second amount. If the first distances is greater than the second distance, the defection at the first distance may be greater than the deflection at the second distance.

With combined reference to FIGS. 7A, 7C, 8A, and 8B, the horizontal spans 302 and the vertical portions 304 may dictate a deflection of the insert 300 in the y and negative y-directions. For example, deflection in the y and negative y-direction may deflect due to a force imposed on the temple assembly 201 by an ear of a user or by some additional equipment. Deflection in the y and negative y-direction may be dictated at least partially by dimensions of the vertical portions 304 and the horizontal spans 302 as discussed below.

Figure 9:
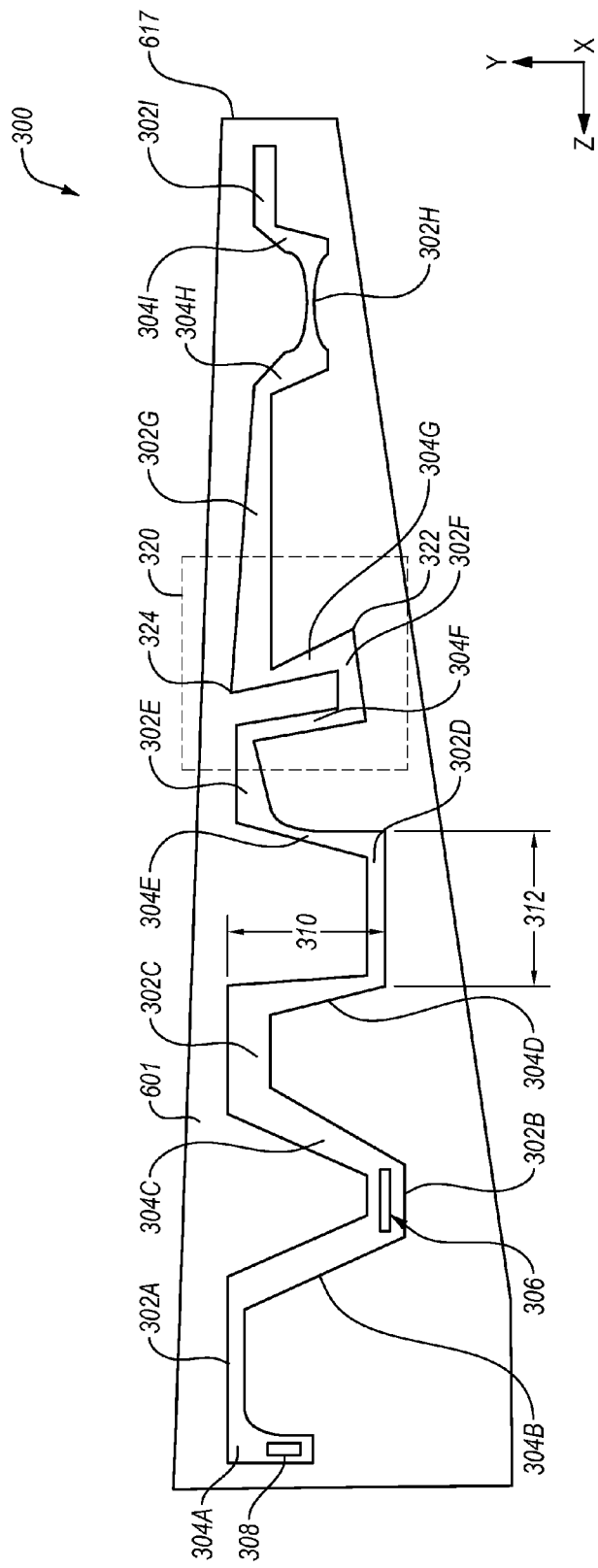
FIG. 9 illustrates an example of the insert of FIG. 7A.

The particular shape of the insert 300 may dictate a particular distribution of the spring force and/or a particular flexibility (e.g., deflection and torsional stiffness) of the temple assembly. FIG. 9 illustrates some additional details of the example insert 300 that may be implemented in the temple assembly 201 of FIGS. 6A-6C. The insert 300 may include one or more features discussed with reference to FIGS. 7A-8B, which are not repeated with reference to FIG. 9. The insert 300 of FIG. 9 is generally wave-shaped. As used herein, wave-shaped may include an overall structure that includes one or more horizontal spans 302A-302H and one or more vertical portions 304A-304I (e.g., 300 of FIGS. 7A-7C).

The horizontal spans 302A-302H include structures that include a long dimension oriented in an arbitrarily defined z-direction and a short dimension oriented in an arbitrarily defined y-direction. The vertical portions 304A-304I include structures that include a long dimension oriented in an arbitrarily defined y-direction and a short dimension oriented in an arbitrarily defined z-direction. The vertical portions 304 and horizontal spans 302 are collectively referred to as elements 302/304. The insert 300 depicted herein includes multiple elements 302/304. In some embodiments, the insert 300 may include one or more elements 302/304, which may be grouped near one or more features of the insert 300 (e.g., near the hinge 104 of FIGS. 5A and 5B).

A subset of the elements 302/304 is discussed herein to provide an example functionality that corresponds to the elements 302/304 of the insert 300. The insert 300 of FIG. 9 represents an example configuration. Other embodiments include subsets of the elements 302/304 described herein in various combinations, without limitation.

A second vertical portion 304B may be a thick vertical portion. The second vertical portion 304B, and thick vertical portions in general, may increase a torsional stiffness. For example, with reference to FIGS. 6A and 9, torsion may include a rotation about one or more axes oriented in the third direction 625C. Thus, the second vertical portion 304B may reduce such rotation. In particular, the second vertical portion 304B may reduce the rotation between a first horizontal span 302A and a second horizontal span 302B or in a portion of the temple assembly 201 around the second vertical portion 304B. The second vertical portion 304B may be located close to the hinge 104 in some embodiments to ensure proper function of the hinge 104.

In addition, the second vertical portion 304B along with the second horizontal span 302B may dictate a deflection in a y-direction or a negative y-direction. For example, a force acting in a positive y-direction at the second end 617 may press the temple assembly 201 such that a third vertical portion 304C moves closer to the second vertical portion 304B in the z-direction, flexing the second horizontal span 302B. The remaining elements 302/304 may be displaced in substantially the positive y-direction. The dimension in the y-direction of the second horizontal span 302B and/or the dimension in the z-direction of the second horizontal span 302B may determine an amount of deflection in the y-direction A sixth vertical portion 304F may be a thin vertical portion. The sixth vertical portion 304F, and thin vertical portion in general, may reduce torsional stiffness (e.g., allow more rotation) when compared to the second vertical portion 304B. The sixth vertical portion 304F may be located away from the hinge 104 in some embodiments to allow the temple substrate to conform to a user with a wide head.

The insert 300 may also include a fourth vertical portion 304D. The fourth vertical portion 304D may have a tapered shape which may enable increasing or decreasing torsional stiffness along the fourth vertical portion 304D. The fourth vertical portion 304D is wider at a third horizontal span 302C and narrower at a fourth horizontal span 302D, which may result in a higher stiffness near the third horizontal span 302C than at the fourth horizontal span 302D. For example, the torsional stiffness may vary linearly between the third horizontal span 302C and the fourth horizontal span 302D.

Additionally, the fourth vertical portion 304D includes an element height 310. The element height 310 represents a more general element dimension (e.g., 310 and 312) that each of the elements 302/304 include. The element height 310 and an element width 312 may generally distribute a spring force along the elements 302/304, which may decrease discomfort. Additionally, the dimensions 310 and 312 may affect the torsional stiffness. For example, a longer element height may increase the torsional stiffness.

A fifth vertical portion 304E may include a necked or irregular vertical portion. The fifth vertical portion 304E may result in a variable torsional stiffness between the fourth horizontal span 302D and a fifth horizontal span 302E. The torsional stiffness between the fourth horizontal span 302D and the fifth horizontal span 302E may vary according to the shape of the fifth vertical portion 304E. An eighth vertical portion 304H and a ninth vertical portion 304I may include sections of variable torsional stiffness vertical segments and sections with linear torsional stiffness.

The horizontal spans 302A-302I may generally determine the flex in or bending in the inward and the outward direction (also referred to herein as deflection). For example, the insert 300 includes the fourth horizontal span 302D that may be relatively long and thin. The fourth horizontal span 302D may accordingly allow more inward/outward flex. In contrast, the third horizontal span 302C may be relatively short and thick, which may allow less inward/outward flex. A seventh horizontal span 302G and the fifth horizontal span 302E may be tapered. Accordingly, the allowed flex in the inward and outward directions may vary linearly along each of these elements 302G/302E.

An eighth horizontal span 302H may include an irregular shape, which may allow an amount of flex in an inward and outward (e.g., x and negative x) direction to vary along the element. For example, at a thinnest portion an allowable flex may be at a maximum, which may reduce as the thickness increases. In addition, the eighth horizontal span 302H may allow torsional stiffness to vary. For example, the torsional stiffness may be greatest at a portion of the eighth horizontal span 302H with a greatest dimension in the y-direction. The torsional stiffness may be least at a portion of the eighth horizontal span 302H with a smallest dimension in the y-direction.

In addition to the functionalities described above, the horizontal spans 302A-302I may position the vertical portions 304 within the temple substrate 601 and vice versa. For example, to control the torsional stiffness, the vertical portions 304 may be place at one or more certain distances from the hinge 104. The horizontal spans 302 may enable such placements.

The insert 300 includes a Z-shaped portion 320. In the Z-shaped portion 320 a sixth horizontal span 302F includes an endpoint 322 that extends in a negative z-direction past a beginning point 324 of the seventh horizontal span 302G. The Z-shaped portion 320 may provide deflections determined by the horizontal spans 302 that overlap in a z-direction. For example, the overlap in the z-direction may increase stiffness in a y-direction. In some embodiments, the insert 300 may include multiple Z-shaped portions 320 or may include a single, Z-shaped portion 320.

In some embodiments, a window 306 may be defined in one or more of the elements 302/304. In the insert 300 of FIG. 9, the window 306 is defined in the second horizontal span 302B, which may increase a flex allowed by the second horizontal span 302B. The window 306 may take rectangular shapes, as well as tapered or irregular shapes, to dictate the properties of the elements 302/304 in which the window 306 is defined. Additionally, at the window 306, the temple substrate may be fixed, which may limit relative motion between the insert 300 and the temple substrate and consequently the torsional stiffness and/or deflection. In some embodiments, a window (e.g., 306 discussed above) may be defined in one or more of the vertical portions 304. Including the window in the vertical portions 304 may decrease the torsional stiffness allowed by the vertical portion.

In some embodiments, the insert 300 and/or one or more of the elements 302/304 may include a protrusion 308. The protrusion 308 may bond to the temple substrate or otherwise be used to join the insert 300 to the temple substrate (e.g., the temple substrate 601). At the protrusion 308, the temple substrate may be fixed, which may limit relative motion between the insert 300 and the temple substrate and consequently the torsional stiffness and/or deflection. In the insert 300, only one protrusion 308 and one window 306 are depicted. In other embodiments multiple protrusions 308 and/or multiple windows 306 may be defined.

Figure 10:
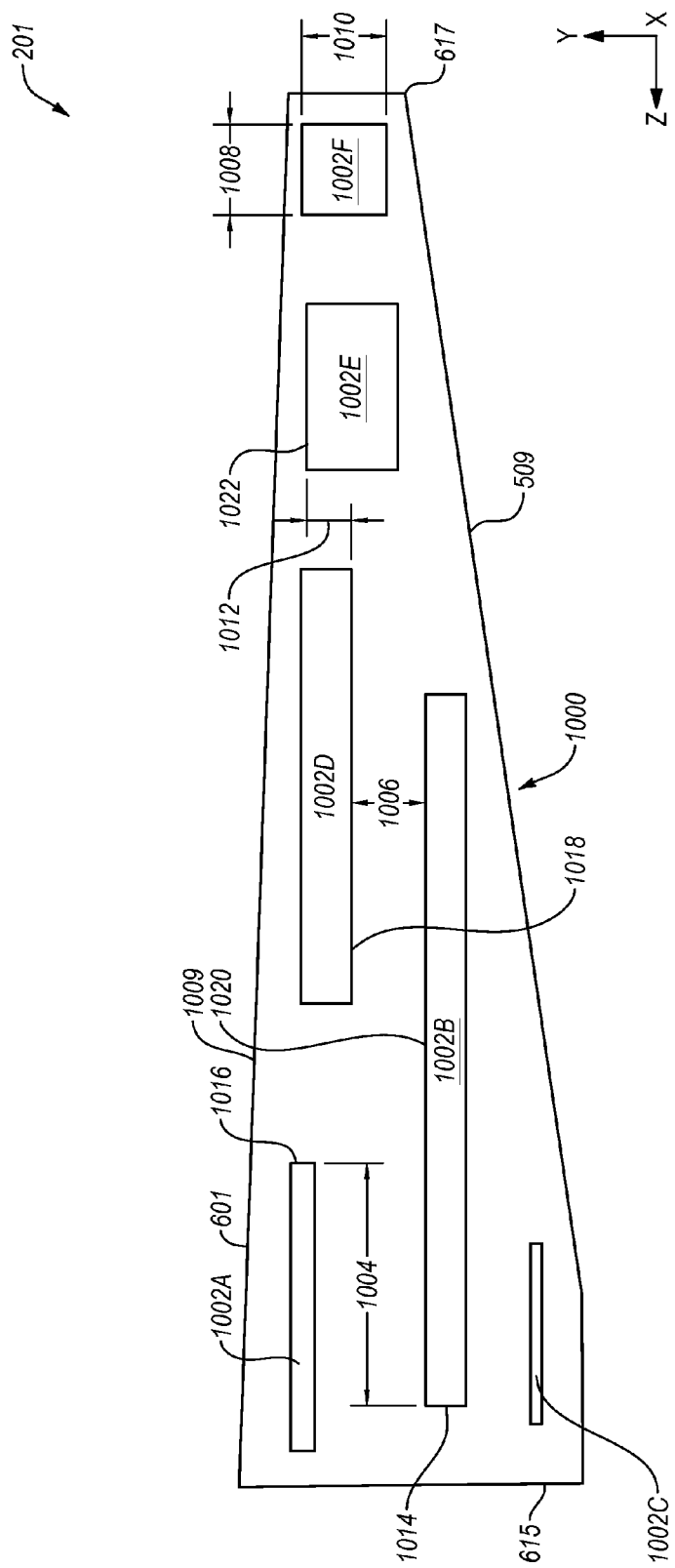
FIG. 10 illustrates another example insert that may be implemented in the temple assemblies of FIG. 2A-2C or 6A-6C.

FIG. 10 illustrates a block diagram of an example insert 1000 that may be implemented in the temple assembly 201 of FIGS. 6A-6C. Although not depicted in FIG. 10, the insert 1000 may also be implemented in the temple assemblies 400 of FIGS. 2A-2C. The insert 1000 includes multiple insert sections 1002A-1002F (generally, insert section 1002 or insert sections 1002). The insert sections 1002 may be molded into the temple substrate 601.

Each of the insert sections 1002 may include an insert width 1008 and an insert height 1010. In FIG. 10, the insert width 1008 and the insert height 1010 of a sixth insert section 1002F are labeled. Each of the other insert sections 1002A-1002E include an insert width 1008 and an insert height 1010. Similar to the dimensions of the horizontal spans and vertical portions in the wave-shaped insert of FIGS. 7A-7C, the insert width 1008 and the insert height 1010 may affect the torsional stiffness and/or the flexibility of the temple substrate 601. For instance, an insert section 1002 with an insert width 1008 that is small (e.g., one-fifth to one-third) relative to the insert height 1010 may function similarly to one of the vertical portions 304 of FIG. 9. Additionally, an insert section 1002 with an insert width 1008 that is large (e.g., three times to five times) relative to the insert height 1010 may function similarly to the one of the horizontal spans 302 of FIG. 9.

In the depicted embodiment, the insert 1000 includes multiple insert sections 1002 with different insert widths 1008 and insert heights 1010. In some embodiments, the insert sections 1002 may each include the same insert width 1008 and/or the insert height 1010. In some embodiments, two or more of the insert sections 1002 may include the same insert width 1008 and/or the insert height 1010.

In addition to the insert height 1010 and the insert width 1008, the characteristics of the temple assembly 201 may be determined by horizontal overlaps 1004, vertical overlaps 1012, and separations 1006. Generally, the horizontal overlap 1004 represents a length in a z-direction measured from a beginning point of one of the insert sections 1002 to an endpoint of another of the insert sections 1002. In the depicted embodiment, the horizontal overlap 1004 between a first insert section 1002A and a second insert section 1002B is labeled. For example, the horizontal overlap 1004 may be measured from a beginning point 1014 of the second insert section 1002B to an endpoint 1016 of the first insert section 1002A. Between some insert sections 1002 (e.g., a fourth insert section 1002D and a fifth insert section 1002E) there may be no horizontal overlap 1004 or there may be horizontal separation.

Generally, the separations 1006 represent a length in a y-direction measured between two of the insert sections 1002. In the depicted embodiment, the separation 1006 between a fourth insert section 1002D and the second insert section 1002B is labeled. For example, the separations 1006 may be measured from a lower surface 1018 of the fourth insert section 1002D to an upper surface 1020 of the second insert section 1002B.

Generally, the vertical overlap 1012 is similar to the separation 1006 except there is generally some horizontal separation between the insert sections 1002 that allows for the vertical overlap 1012. The vertical overlap 1012 represents a length in a y-direction measured between surfaces of two of the insert sections 1002. In the depicted embodiment, the vertical overlap 1012 between the fourth insert section 1002D and the second insert section 1002B is labeled. For example, the vertical overlap 1012 may be measured from the lower surface 1018 of the fourth insert section 1002D to an upper surface 1022 of the fifth insert section 1002E.

As mentioned above, the characteristics of the temple assembly 201 may be determined by the horizontal overlaps 1004, the vertical overlaps 1012, the separations 1006, and combinations thereof. For example, a large horizontal overlap 1004 may provide torsional stiffness about one or more axes parallel to the z-axis. In addition, the large horizontal overlap 1004 may provide resistance to flex along portions of the temple assembly 201 that include the horizontal overlap 1004. Alternatively, a large horizontal separation (e.g., between the fourth insert section 1002D and the fifth insert section 1002E) may enable the temple substrate 601 to flex or deflect in the x-direction. For example, a portion of the temple assembly 201 including the sixth insert section 1002F may flex in the x and negative x directions relative to a portion of the temple assembly 201 including the fifth insert section 1002E.

The separations 1006 and the vertical overlaps 1012 may affect the torsional stiffness. For example, a large separation 1006 may position insert sections 1002 near the bottom surface 509 and a top surface 1009 if the temple substrate 601. Accordingly, the temple substrate 601 near the bottom surface 509 and the top surface 1009 may be rigid relative to portions of the template substrate 601 not including the insert sections 1002. In addition, a large separation 1006 may enable the two portions of the temple substrate 601 to move relative to one another. Moreover, the separations 1006 with the horizontal overlaps 1004 may combine to affect the torsional stiffness and flex. For instance, a large horizontal overlap 1004 and a small separation 1006 may provide a rigid portion of the temple substrate 601 while a small horizontal overlap 1004 and a large separation 1006 may provide for a flexible portion with low torsional stiffness.

The insert sections 1002 in the depicted embodiment have a substantially rectangular cross section in the yz-plane. In other embodiments, the insert sections 1002 may have cross sections in the yz-plane that are round, triangular, angled parallelograms, and the like. In addition, in the xy-plane, the insert sections 1002 may include a circular or constant cross section. In addition, there may be a depth overlap and separation in the x-direction.

Figure 11A:
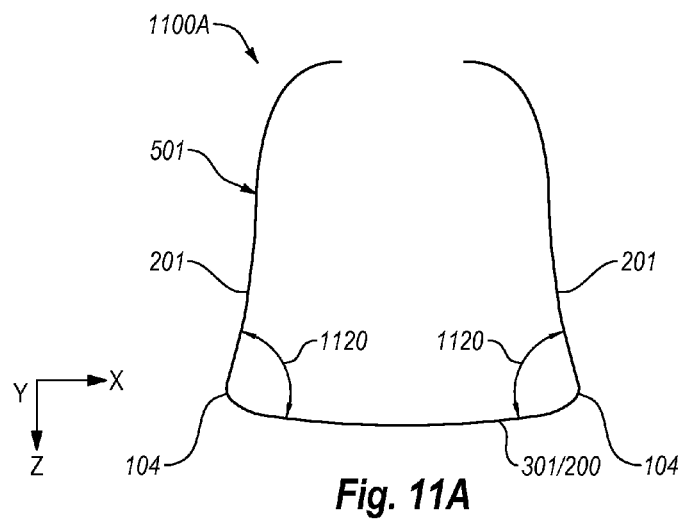
FIGS. 11A-11C illustrate some example deflection profiles of the eyewear of FIGS. 5A and 5B, all in accordance with at least one embodiment discussed herein.
Figure 11B:
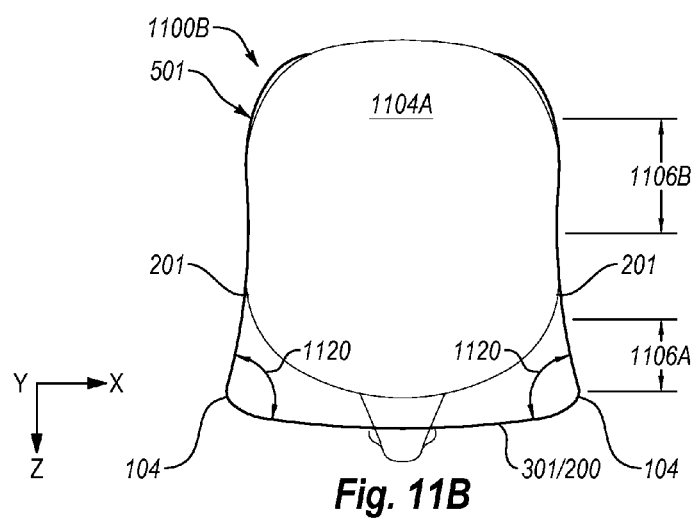
Figure 11C:
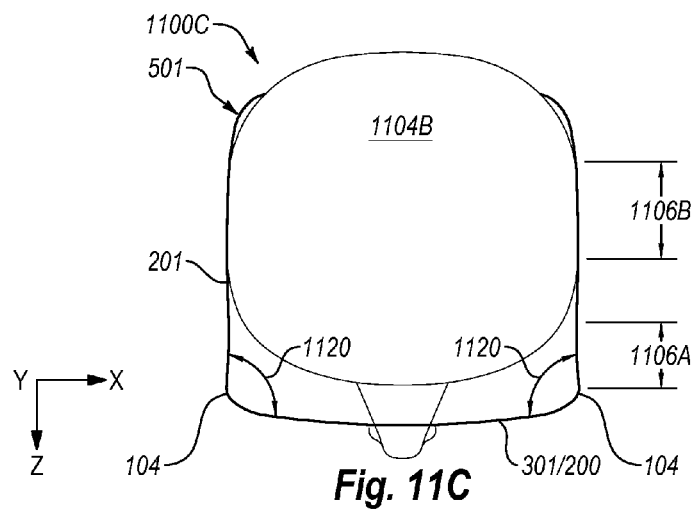

FIGS. 11A-11C illustrate some example deflection profiles 1100A-1100C of the eyewear 501 of FIGS. 5A and 5B. The deflection profiles 1100A-1100C are included to illustrate that the temple assemblies 201 may include multiple regions 1106A and 1106B with different deflection characteristics. The deflection profiles 1100A-1100C include views from above a head of a user. For example, the brow piece 301 and the lens 200 may be oriented in the y-direction. In general, the regions 1106A and 1106B may be optimized to reduce discomfort caused by the eyewear 501 and to securely retain the eyewear to users having varying-shaped heads.

FIG. 11A depicts a top view of the first deflection profile 1100A, which is an un-deflected shape of the eyewear 501. For instance, the first deflection profile 1100A may be the shape of the eyewear 501 when the eyewear 501 is not being worn by the user. FIG. 11B a second deflection profile 1100B that may result when the eyewear 501 is worn by a first user having a narrow head 1104A. FIG. 11C depicts a third deflection profile 1100C that may result when the eyewear 501 is worn by a second user having a wide head 1104B.

With reference to FIG. 11A, the first deflection profile 1100A of the un-deflected shape may be caused largely by the insert inward curvature 340 of FIG. 7B and the substrate inward curvature 621 of FIG. 6C. The un-deflected shape may generally produce an inward-oriented force.

With reference to FIGS. 11B and 11C, when worn by the first user or the second user, the eyewear 501 may deflect. A particular manner in which the eyewear 501 deflects may be based on a shape of a head (1104A and 1104B) of a user and the structure of the temple substrates and inserts of the temple assemblies 201. In some embodiments, a resulting deflection profile such as the second deflection profile 1100B and the third deflection profile 1100C may include one or more deflection regions 1106A and 1106B.

The deflection regions 1106A and 1106B generally represent a portion of the temple assembly 201 configured with a particular deflection characteristic and torsional stiffness. For example, a first deflection region 1106A includes a portion of the temple assembly 201 from the hinge 104 to about one-third down the temple assembly 201, and a second deflection region 1106B includes a second portion of the temple assembly 201 from about two-thirds down the temple assembly 201 to about five-sixths down the temple assembly 201. The second deflection region 1106B may approximate and/or correspond to a portion of the temple assemblies 201 that may be above the ears of the user when the eyewear 501 is worn.

With combined reference to FIGS. 11B and 11C, the first deflection region 1106A may be configured for deflection. The deflection may include deformation in substantially the x and negative x directions and may affect magnitude angles 1120 between the brow piece 301 and the temple assemblies 201. The deflection may allow the eyewear 501 to be worn comfortably along the sides of the head 1104A or 1104B of the user. Accordingly, the insert (e.g., the insert 300 described in this disclosure) and thus the temple assemblies 201 may be configured to provide a large deflection in the first deflection region 1106A. For example, the temple assemblies 201 may enable a range of the angles 1120 from about 100 degrees to about 65 degrees while the hinges 104 are open (e.g., the temple assemblies 201 are substantially removed from the volume 505 of FIGS. 5A and 5B).

In contrast, the second deflection region 1106B may be configured to allow torsional flexibility rather than deflection. The torsional flexibility may enable the temple assemblies to conform to the heads 1104A or 1104B in the y-direction but not in the x and negative direction. Enabling the torsional flexibility rather than the deflection in the second deflection region 1106B may be because deflection in the second deflection region 1106B may not be a significant factor in comfort and/or fit.

The present invention may be embodied in other specific forms without departing from its spirit. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A temple assembly that is configured to retain one or more lenses relative to a head of a user, the temple assembly comprising:
    a temple substrate that is comprised of one or more polymers; and
    an insert that is located at least partially within the temple substrate, wherein:
        the insert is configured to impose a spring force against the head of the user;
        the insert is configured to allow at least a portion of the temple substrate to rotate axially about at least a portion of the insert such that the portion of the temple substrate deforms relative to the insert and at least partially independently of the insert;
        the insert includes a vertical portion and two or more horizontal spans;
        a first horizontal span of the two or more horizontal spans is configured to dictate deflection of a first portion of the temple substrate and to enable rotation of the first portion of the temple substrate about the first horizontal span and the first horizontal span includes a first insert width and a first insert height;
        a second horizontal span of the two or more horizontal spans is configured to dictate deflection of a second portion of the temple substrate and to enable rotation of the second portion of the temple substrate about the second horizontal span and the second horizontal span includes a second insert width and a second insert height; and
        the vertical portion is configured to dictate a torsional stiffness of a third portion of the temple assembly and the vertical portion includes a third insert width and a third insert height.

2. The temple assembly of claim 1, wherein the insert is comprised of a metal alloy and includes one or more rectangular cross sections.

3. The temple assembly of claim 1, wherein the insert includes a mechanical interlock at a first end that is configured to reduce an angle of rotation of the temple substrate relative to the insert in an area around the mechanical interlock.

4. The temple assembly of claim 1, wherein the temple substrate is configured to distribute the spring force along a height of the temple substrate.

5. The temple assembly of claim 1, wherein:
    the insert includes one or more additional portions,
    the one or more additional portions of the insert are not permanently attached to the temple substrate, and
    the temple substrate rotates axially about the additional portions of the insert that are not permanently attached to the temple substrate.

6. The temple assembly of claim 1, wherein the insert includes one or more insert sections that are molded into the temple substrate.

7. The temple assembly of claim 6, wherein the the vertical portion and the two or more horizontal spans are separated by one or more or a combination of a horizontal overlap, a vertical overlap, and a separation.

8. Eyewear comprising one or more temple assemblies, wherein each of the temple assemblies includes:
    a temple substrate that includes a first end and a second end, between which a longitudinal direction is defined; and
    an insert that is located at least partially within the temple substrate, is configured to impose a spring force against a head of a user, and includes a vertical portion and two or more horizontal spans,
    wherein:
        the vertical portion of the insert includes a long dimension in a direction substantially perpendicular to the longitudinal direction and a short dimension in the longitudinal direction;
        the vertical portion provides resistance to rotation axially of a portion of the temple substrate about the vertical portion;
        a first horizontal span of the two or more horizontal spans connects to the vertical portion and includes a long dimension in the longitudinal direction and a short dimension in the direction substantially perpendicular to the longitudinal direction;
        the first horizontal span is configured to allow a portion of the temple substrate to rotate axially about the horizontal span such that the portion of the temple substrate deforms relative to the horizontal span and at least partially independently of the horizontal span;
        a second horizontal span of the two or more horizontal includes a long dimension in the longitudinal direction and a short dimension in the direction substantially perpendicular to the longitudinal direction; and
        the second horizontal span is connected to the vertical span and is included on a portion of the insert between the vertical portion and an end of the insert.

9. The eyewear of claim 8, wherein:
    the temple substrate is comprised of one or more polymers;
    the insert is comprised of a metal alloy; and
    the temple substrate is flexible relative to the insert.

10. The eyewear of claim 9, wherein:
    the temple substrate includes a bottom surface that is configured to be placed on a connection between the head of the user and an ear of the user;
    the insert is configured to impose a spring force against the head of the user; and
    the spring force secures the temple assembly relative to the head of the user.

11. The eyewear of claim 8, wherein the insert defines a window.

12. The eyewear of claim 11, wherein the window is configured to limit relative motion between at least a portion of the insert and at least a portion of the temple substrate.

13. A temple assembly comprising:
a temple substrate comprised of one or more flexible polymers; and
an insert that is located within the temple substrate and includes a vertical portion, a first horizontal span, a second horizontal span, a first end, a second end, and a longitudinal direction defined between the first end and the second end,
wherein:
   the first horizontal span is connected to the vertical portion and is included on a portion of the insert between the vertical portion and the first end;
   the second horizontal span is connected to the vertical portion and is included on a portion of the insert between the vertical portion and the second end;
   the vertical portion of the insert includes a long dimension in a direction substantially perpendicular to the longitudinal direction and a short dimension in the longitudinal direction;
   the vertical portion provides resistance to rotation axially of a portion of the temple substrate about the vertical portion; and
   the first horizontal span and the second horizontal span include a long dimension in the longitudinal direction and a short dimension in the direction substantially perpendicular to the longitudinal direction.

14. The temple assembly of claim 13, wherein:
the insert includes a second vertical portion that is positioned at the first end;
the insert defines a window at the second end; and
a protrusion on the second vertical portion that is configured to bond the insert to the temple substrate.

15. The temple assembly of claim 13, wherein:
the first horizontal span is configured to allow a first portion of the temple substrate to rotate axially about the first horizontal span such that the first portion of the temple substrate deforms relative to the first horizontal span and at least partially independently of the first horizontal span;
the second horizontal span is configured to allow a second portion of the temple substrate to rotate axially about the second horizontal span such that the second portion of the temple substrate deforms relative to the second horizontal span and at least partially independently of the second horizontal span; and
the vertical portion is configured such that rotation of the vertical portion flexes one or both of the first horizontal span and the second horizontal span.

16. The temple assembly of claim 13, wherein:
the temple substrate includes a bottom surface that may be placed on a connection between a head of a user and an ear of the user;
the insert is configured to impose a spring force against the head of the user;
the spring force secures the temple assembly relative to the head of the user; and
the insert is comprised of an alloy that includes titanium.

17. The temple assembly of claim 13, wherein the insert includes a third horizontal span that is a necked or an irregular horizontal span.

18. The temple assembly of claim 13, wherein:
the insert includes a third horizontal span connected to a fourth horizontal span via a second vertical portion;
the third horizontal span is closer to the first end than the fourth horizontal span;
the third horizontal span includes an endpoint that includes the furthest point on the third horizontal span from the first end;
the fourth horizontal span includes a beginning point that includes the nearest point on the fourth horizontal span to the first end; and
the beginning point of the fourth horizontal span is closer to the first end than the endpoint of the third horizontal span.

* * * * *